US012594880B2

(12) United States Patent (10) Patent No.: US 12,594,880 B2

Nagata (45) Date of Patent: Apr. 7, 2026

(54) INFORMATION PROCESSING APPARATUS, INFORMATION PROCESSING METHOD, PROGRAM, AND PROJECTION APPARATUS

(71) Applicant: Sony Group Corporation, Tokyo (JP)

(72) Inventor: Koji Nagata, Tokyo (JP)

(73) Assignee: Sony Group Corporation, Tokyo (JP)

( * ) Notice: Subject to any disclaimer, the term of this patent is extended or adjusted under 35 U.S.C. 154(b) by 140 days.

(21) Appl. No.: 18/246,192

(22) PCT Filed: Sep. 9, 2021

(86) PCT No.: PCT/JP2021/033096

§ 371 (c)(1),
(2) Date: Mar. 22, 2023

(87) PCT Pub. No.: WO2022/070819

PCT Pub. Date: Apr. 7, 2022

(65) Prior Publication Data

US 2024/0010122 A1 Jan. 11, 2024

(30) Foreign Application Priority Data

Oct. 1, 2020 (JP) ................................ 2020-167177

(51) Int. Cl.
*B60Q 1/54* (2006.01)
*B60Q 1/44* (2006.01)
(Continued)

(52) U.S. Cl.
CPC .............. *B60Q 1/54* (2013.01); *B60Q 1/444* (2013.01); *B60Q 1/525* (2013.01); *B60W 30/0956* (2013.01); *B60Q 2400/50* (2013.01)

(58) Field of Classification Search
CPC .......... B60Q 1/54; B60Q 1/444; B60Q 1/525; B60Q 2400/50; B60Q 1/535; B60Q 1/543; B60W 30/0956
See application file for complete search history.

(56) References Cited

U.S. PATENT DOCUMENTS 6,140,918 A * 10/2000 Green .................. B60Q 1/2611
340/471
9,845,043 B1 * 12/2017 Webb ..................... B60K 35/80
(Continued)

FOREIGN PATENT DOCUMENTS

CN 106458087 A 2/2017
CN 106573573 A 4/2017
(Continued)

OTHER PUBLICATIONS

International Search Report and Written Opinion mailed on Oct. 12, 2021, received for PCT Application PCT/JP2021/033096, filed on Sep. 9, 2021, 9 pages including English Translation.

*Primary Examiner* — Daryl C Pope
(74) *Attorney, Agent, or Firm* — XSENSUS LLP

(57) ABSTRACT

An information processing apparatus according to an embodiment of the present technology includes an acquisition unit and a projection control unit. The acquisition unit acquires speed-related information regarding a speed of a vehicle. The projection control unit controls, on the basis of the speed-related information, display of a projection pattern projected on a peripheral road surface of the vehicle from the projection unit mounted on the vehicle.

20 Claims, 12 Drawing Sheets

(51) Int. Cl.
    *B60Q 1/50*       (2006.01)
    *B60W 30/095*    (2012.01)

(56)        References Cited

U.S. PATENT DOCUMENTS

| | | | | |
|---|---|---|---|---|
| 10,604,061 | B2 * | 3/2020 | Huang | G06F 3/013 |
| 11,926,344 | B1 * | 3/2024 | Roy | G08G 1/04 |
| 2003/0146827 | A1 * | 8/2003 | Koike | B60Q 1/543 |
| | | | | 340/436 |
| 2004/0114921 | A1 * | 6/2004 | Braun | G01C 11/025 |
| | | | | 396/661 |
| 2008/0175012 | A1 * | 7/2008 | Shimaoka | B60Q 9/008 |
| | | | | 362/464 |
| 2017/0101147 | A1 | 4/2017 | Hasegawa | |
| 2017/0203685 | A1 | 7/2017 | Hirai | |
| 2017/0267167 | A1 | 9/2017 | Sakata | |
| 2019/0322210 | A1 | 10/2019 | Han | |
| 2019/0329708 | A1 | 10/2019 | Hakki | |
| 2023/0264624 | A1 * | 8/2023 | Yasuda | B60Q 9/00 |
| | | | | 701/70 |

| | | | | |
|---|---|---|---|---|
| 2023/0331146 | A1 * | 10/2023 | Pita Gil | F21S 41/65 |
| 2024/0181957 | A1 * | 6/2024 | Mouri | B60Q 1/16 |
| 2024/0395137 | A1 * | 11/2024 | Morita | G08G 1/095 |

FOREIGN PATENT DOCUMENTS

| | | | |
|---|---|---|---|
| CN | 106660479 | A | 5/2017 |
| CN | 107878301 | A | 4/2018 |
| CN | 110450705 | A | 11/2019 |
| CN | 110949241 | A | 4/2020 |
| CN | 111065547 | A | 4/2020 |
| CN | 116194974 | A | 5/2023 |
| EP | 1334871 | A2 | 8/2003 |
| EP | 3470266 | A1 | 4/2019 |
| JP | 2006-036005 | A | 2/2006 |
| JP | 2016101797 | A | 6/2016 |
| JP | 2017-001563 | A | 1/2017 |
| JP | 2020055519 | A | 4/2020 |
| KR | 20130006071 | A | 1/2013 |
| WO | 2016/027314 | A1 | 2/2016 |
| WO | WO-2016114048 | A1 | 7/2016 |

\* cited by examiner

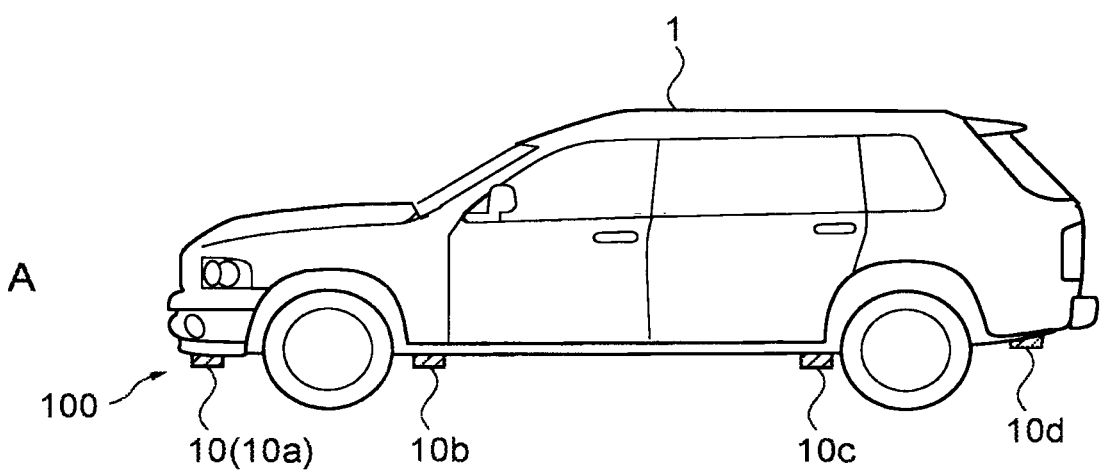
A
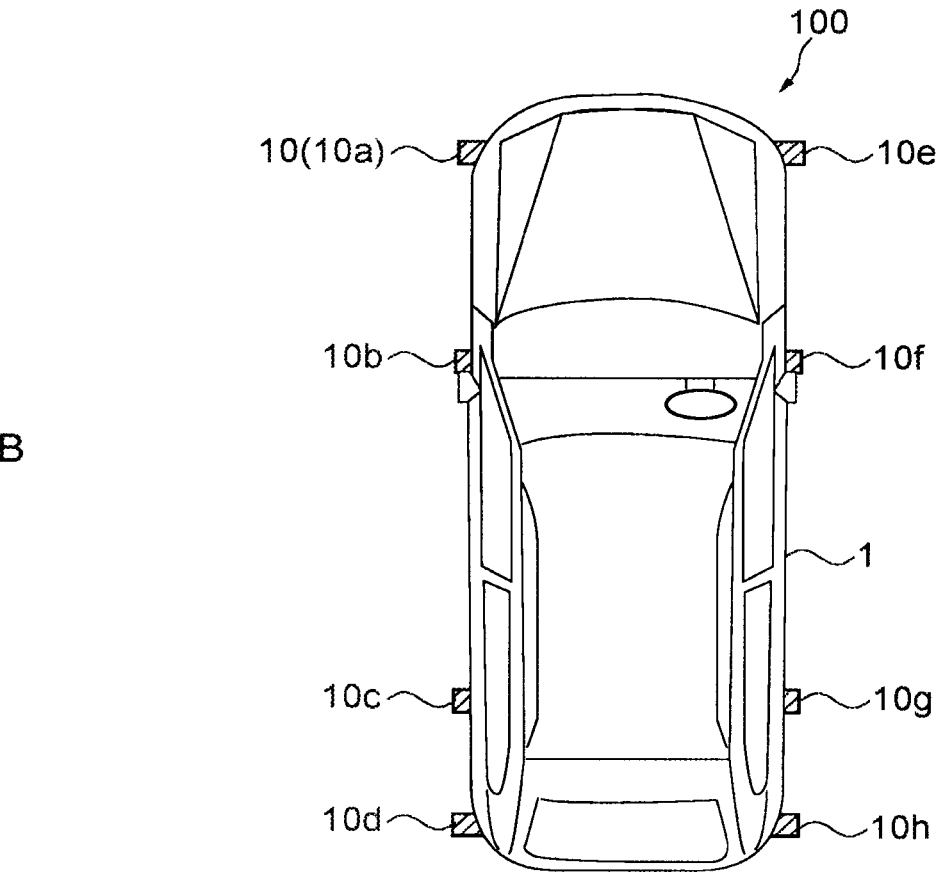
B
FIG.1

A
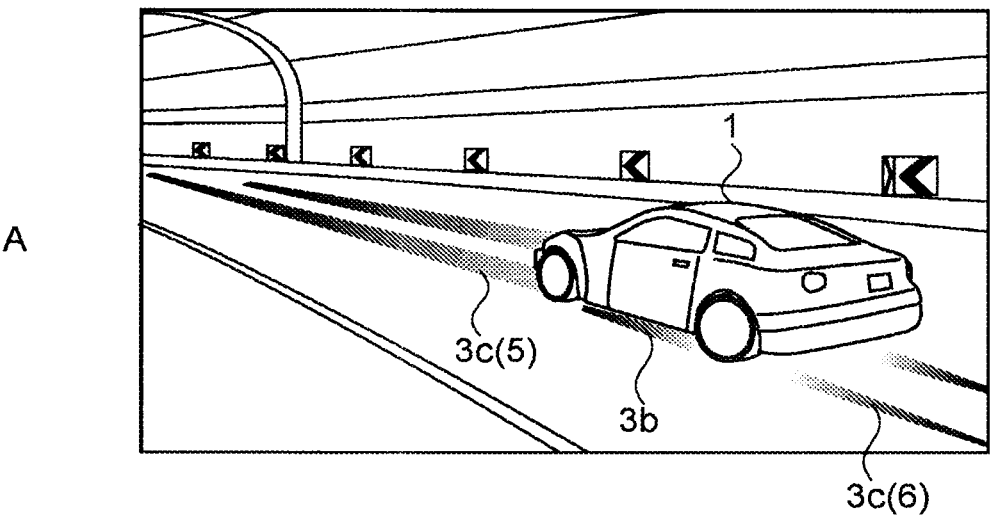
B
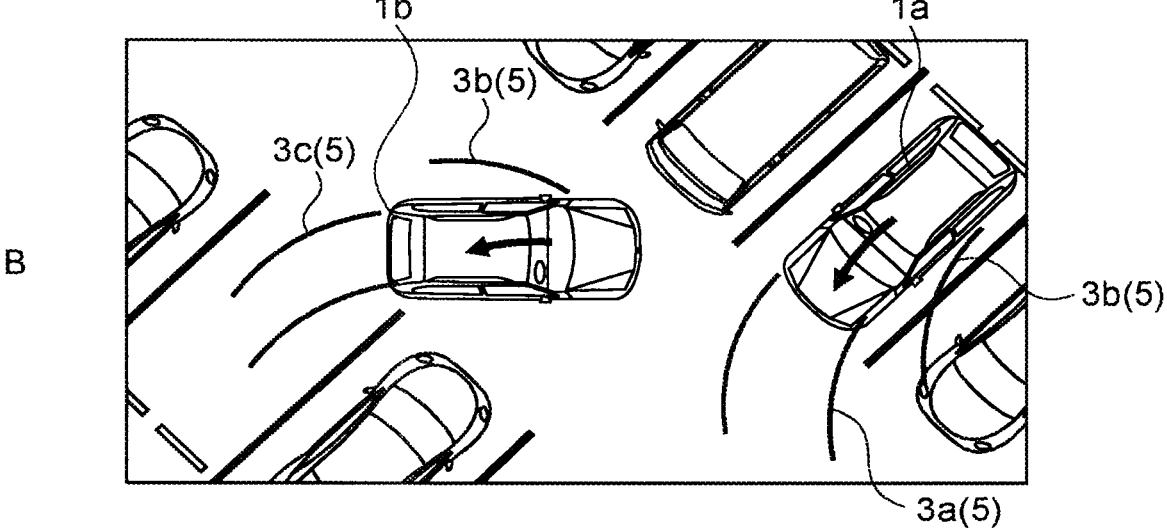
FIG.3

W1

| | | | | | P | N | D or R |
|---|---|---|---|---|---|---|---|
| Brake Pedal | Feet On | | No Feet | | Parking Sign | Line width 1% | Line width 1% |
| | | | | | | Line width 1% | Line width 3% |
| | No Feet | Accelerator Pedal | Feet On | Accelerator Pedal Opening | | | |
| | | | | ~0% | | Line width 1% | Line width 5% |
| | | | | ~10% | | Line width 1% | Line width 10% |
| | | | | ~20% | | Line width 1% | Line width 20% |
| | | | | ~30% | | Line width 1% | Line width 30% |
| | | | | ~40% | | Line width 1% | Line width 40% |
| | | | | ~50% | | Line width 1% | Line width 50% |
| | | | | ~60% | | Line width 1% | Line width 60% |
| | | | | ~70% | | Line width 1% | Line width 70% |
| | | | | ~80% | | Line width 1% | Line width 80% |
| | | | | ~90% | | Line width 1% | Line width 90% |
| | | | | ~100% | | Line width 1% | Line width 100% |

A

W2

| | | | | P | N | D or R |
|---|---|---|---|---|---|---|
| Brake Pedal | No Feet | | n/a | Parking Sign | Extremely thin line | Extremely thin line |
| | Feet On | Brake Pedal Opening | ~0% | | Extremely thin line | Extremely thin line |
| | | | ~10% | | Extremely thin line | Line width 10% |
| | | | ~20% | | Extremely thin line | Line width 20% |
| | | | ~30% | | Extremely thin line | Line width 30% |
| | | | ~40% | | Extremely thin line | Line width 40% |
| | | | ~50% | | Extremely thin line | Line width 50% |
| | | | ~60% | | Extremely thin line | Line width 60% |
| | | | ~70% | | Extremely thin line | Line width 70% |
| | | | ~80% | | Extremely thin line | Line width 80% |
| | | | ~90% | | Extremely thin line | Line width 90% |
| | | | ~100% | | Extremely thin line | Line width 100% |

L1 = Normal blind distance L0 + L1'

A

| | | L1' |
|---|---|---|
| Speed | 0-10km/h(10 exclusive) | 3m |
| | 10km/h-20km/h(20 exclusive) | 5m |
| | 20km/h-30km/h(30 exclusive) | 10m |
| | 30km/h-40km/h(40 exclusive) | 18m |
| | 40km/h-50km/h(50 exclusive) | 28m |
| | 50km/h-60km/h(60 exclusive) | 40m |
| | 60km/h-70km/h(70 exclusive) | 54m |
| | 70km/h-80km/h(80 exclusive) | 72m |
| | 80km/h-90km/h(90 exclusive) | 89m |
| | 90km/h-100km/h(100 exclusive) | 108m |
| | 100km/h or more | 108m |

B

| | | L2 |
|---|---|---|
| Speed | 0-10km/h(10 exclusive) | 3m |
| | 10km/h-20km/h(20 exclusive) | 6m |
| | 20km/h-30km/h(30 exclusive) | 8m |
| | 30km/h-40km/h(40 exclusive) | 11m |
| | 40km/h-50km/h(50 exclusive) | 14m |
| | 50km/h-60km/h(60 exclusive) | 17m |
| | 60km/h-70km/h(70 exclusive) | 19m |
| | 70km/h-80km/h(80 exclusive) | 22m |
| | 80km/h-90km/h(90 exclusive) | 25m |
| | 90km/h-100km/h(100 exclusive) | 28m |
| | 100km/h or more | 28m |

FIG.9

225 Surrounding environment recognition unit

212 Surrounding environment sensor unit (Rear camera)

230 Object detection unit

231 Relative speed calculation unit

223 Projection image determination unit

A
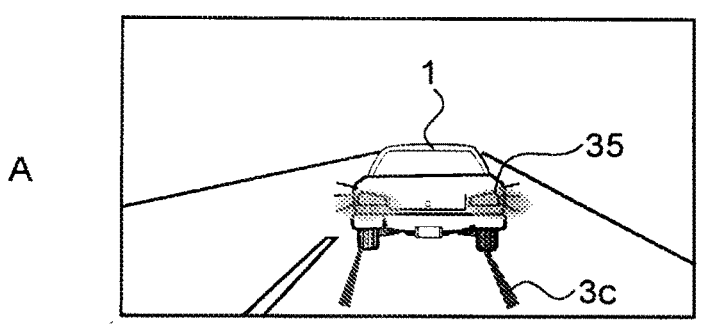
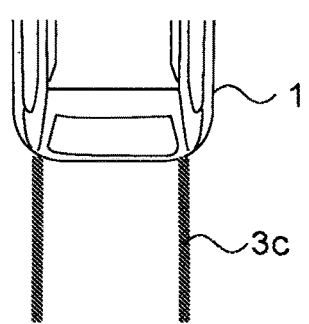
B
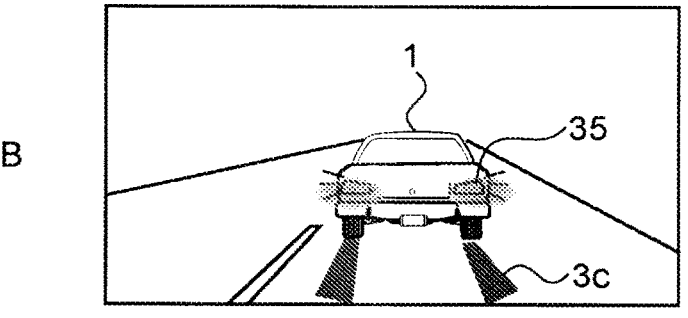
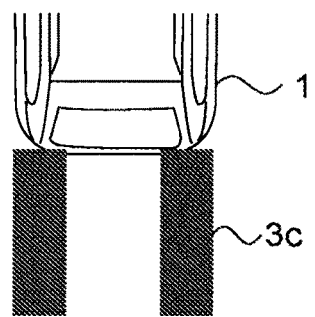
C
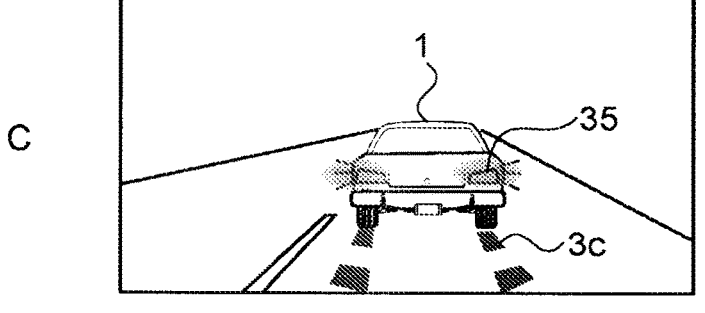
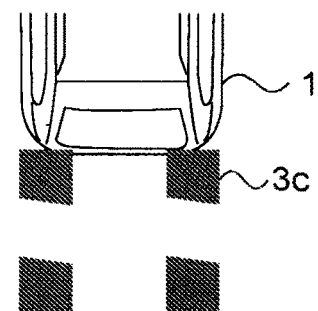
FIG.14

INFORMATION PROCESSING APPARATUS, INFORMATION PROCESSING METHOD, PROGRAM, AND PROJECTION APPARATUS

CROSS-REFERENCE TO RELATED APPLICATIONS

The present application is based on PCT filing PCT/JP2021/033096, filed Sep. 9, 2021, which claims priority to Japanese Application No. 2020-167177, filed Oct. 1, 2020, the entire contents of each are incorporated herein by reference.

TECHNICAL FIELD

The present technology relates to an information processing apparatus, an information processing method, a program, and a projection apparatus that can be applied to display control of a projection pattern to be projected to a road surface from a vehicle.

BACKGROUND ART

Patent Literature 1 has described a predicted traveling trajectory display apparatus that displays a predicted traveling trajectory of a vehicle on the ground. This apparatus calculates a predicted traveling trajectory of a vehicle on the basis of a steering angle of a vehicle steering wheel and forward movement/backward movement information indicating a forward movement/backward movement of the vehicle. Then, it controls an irradiation angle of a laser light emitter mounted on the vehicle and draws the predicted traveling trajectory on the ground (paragraphs [0021], [0022], [0023] of specification, FIG. 7, and the like in Patent Literature 1).

CITATION LIST

Patent Literature

Patent Literature 1: Japanese Patent Application Laid-open No. 2006-036005

DISCLOSURE OF INVENTION

Technical Problem

Presenting a traveling direction outside of the vehicle as described above can indicate a movement direction or the like to pedestrians outside the vehicle and drivers of other vehicles. However, it may be difficult to check behaviors such as acceleration and deceleration of a vehicle from the outside of the vehicle. Therefore, it is desirable to provide a technology by which behaviors of a vehicle can be represented to people outside the vehicle in an easy-to-understand manner.

In view of the above-mentioned circumstances, it is an objective of the present technology to provide an information processing apparatus, an information processing method, a program, and a projection apparatus by which behaviors of a vehicle can be represented to people outside the vehicle in an easy-to-understand manner.

Solution to Problem

In order to accomplish the above-mentioned objective, an information processing apparatus according to an embodiment of the present technology includes an acquisition unit and a projection control unit.

The acquisition unit acquires speed-related information regarding a speed of a vehicle.

The projection control unit controls, on the basis of the speed-related information, display of a projection pattern projected on a peripheral road surface of the vehicle from the projection unit mounted on the vehicle.

In this information processing apparatus, the projection unit provided in the vehicle projects the projection pattern on the peripheral road surface. The display of the projection pattern is controlled on the basis of the speed-related information regarding the speed of the vehicle. Accordingly, the projection pattern can be changed in accordance with behaviors of the vehicle, and the behaviors of a vehicle can be represented to people outside the vehicle in an easy-to-understand manner.

An information processing method according to an embodiment of the present technology is an information processing method to be executed by a computer system and includes acquiring speed-related information regarding a speed of a vehicle.

Display of a projection pattern projected on a peripheral road surface of the vehicle from a projection unit mounted on the vehicle is controlled on the basis of the speed-related information.

A program according to an embodiment of the present technology causes a computer system to execute the following steps.

A step of acquiring speed-related information regarding a speed of a vehicle.

A step of controlling, on the basis of the speed-related information, display of a projection pattern projected on a peripheral road surface of the vehicle from a projection unit mounted on the vehicle.

A projection apparatus according to an embodiment of the present technology includes a projection unit, an acquisition unit, and a projection control unit.

The projection unit is mounted on a vehicle and projects a projection pattern on a peripheral road surface of the vehicle.

The acquisition unit acquires speed-related information regarding a speed of a vehicle.

The projection control unit controls, on the basis of the speed-related information, display of the projection pattern projected from the projection unit.

BRIEF DESCRIPTION OF DRAWINGS

FIG. 1 A schematic view showing an outer appearance of a vehicle on which a projection apparatus according to a first embodiment of the present technology is mounted.

FIG. 3 A schematic view showing examples of a scene where the projection patterns are projected.

FIG. 8 A table showing an example of width control for the line pattern.

FIG. 9 A table showing an example of length control for the line pattern.

FIG. 14 A schematic view showing examples of rear patterns according to a brake operation level.

MODE(S) FOR CARRYING OUT THE INVENTION

Figure 2:
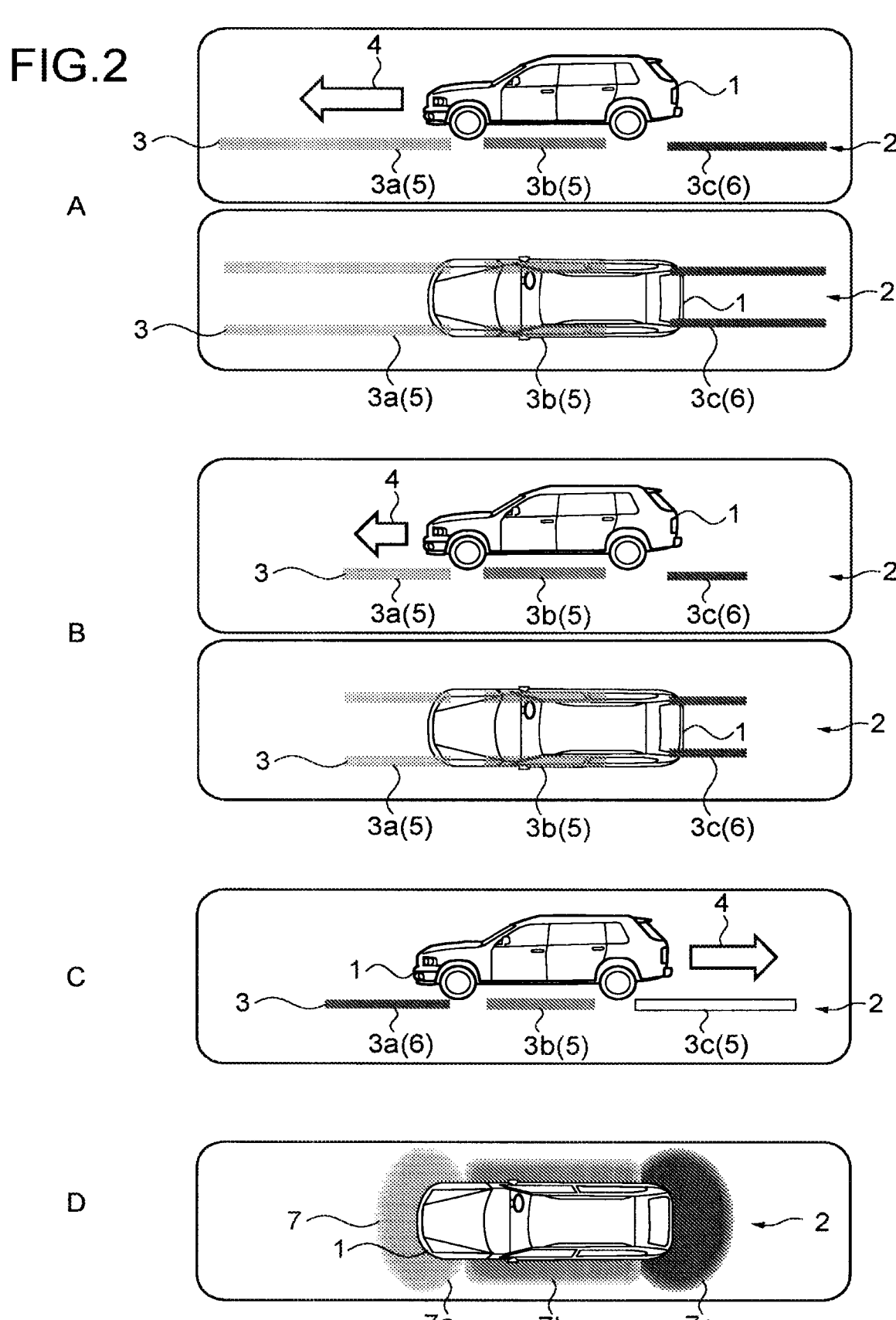
FIG. 2 A schematic view showing examples of projection patterns.

Hereinafter, embodiments according to the present technology will be described with reference to the drawings.

First Embodiment

FIG. 1 is a schematic view showing an outer appearance of a vehicle on which a projection apparatus according to a first embodiment of the present technology is mounted. FIG. 1A is a perspective view showing a configuration example of a vehicle 1 and FIG. 1B is a top view of the vehicle 1 as viewed from above. A projection apparatus 100 is mounted on the vehicle 1. The projection apparatus 100 projects figures on a peripheral road surface of the vehicle 1.

The projection apparatus 100 has a plurality of projection units 10. The projection units 10 are elements (projectors) that project figures by radiating light to a road surface. Hereinafter, figures projected from the projection units 10 to the peripheral road surface of the vehicle 1 will be referred to as projection patterns. The projection apparatus 100 is capable of individually controlling projection patterns projected from the respective projection units 10. A specific configuration of the projection unit 10 will be described later.

Eight projection units 10a to 10h provided to the vehicle 1 are schematically shown in FIGS. 1A and 1B. In the example shown in FIG. 1, the projection units 10a to 10d and the projection units 10e to 10h are arranged to be line-symmetric to each other on left and right sides of a bottom portion of the vehicle 1.

The projection units 10a and 10e are arranged in a front bottom portion of the vehicle 1 (e.g., a lower portion of the front bumper). The projection units 10a and 10e project projection patterns on the front of the vehicle 1, for example. The projection units 10b and 10f are arranged at front bottom portions of front doors. The projection units 10c and 10g are arranged at rear bottom portions of rear doors. The projection units 10b and 10f and the projection units 10c and 10g project projection patterns on lateral sides of the vehicle 1, for example. The projection units 10d and 10h are arranged in a rear bottom portion of the vehicle 1 (e.g., a lower portion of the rear bumper). The projection units 10d and 10h project projection patterns on the rear of the vehicle 1, for example.

It should be noted that in FIG. 1B, in order to show positions of the respective projection units 10 (projectors) in the top view of the vehicle 10, for the sake of convenience, the respective projection units 10 are shown protruding from the vehicle body. In the actual configuration, the projection units 10 are housed in a vehicle body lower portion and installed so that they cannot be seen from above. This allows the projection apparatus 100 to be implemented without deteriorating the outer appearance of the vehicle 10.

Alternatively, as shown in FIG. 1B, the respective projection units 10 may be installed protruding from the vehicle body. Accordingly, for example, it is possible to enlarge the range in which the projection patterns can be projected.

The arrangement, number, and the like of the projection units 10 are not limited.

For example, the projection units 10 (the projection units 10a and 10e in FIG. 1) that project patterns on the front of the vehicle 10 may be installed on a vehicle body front surface. Specifically, the projection units 10 may be provided at the periphery of head lights (e.g., upper, lower, left, and right sides of the head lights) or at the periphery of the fog lights (e.g., upper, lower, left, and right sides of the fog lights). Moreover, the projection units 10 may be provided at a front grille position, a center portion of the entire vehicle body surface, and the like. Moreover, left front and right front projection patterns may be projected from a single projection unit 10.

Moreover, for example, the projection units 10 (the projection units 10b, 10c, 10f, and 10g in FIG. 1) that project patterns on the lateral sides of the vehicle 10 may be provided in bottom portions of side-view mirrors and lower portions of b-pillars dividing the front and rear doors (center portions of the vehicle in a front-rear direction).

Moreover, for example, the projection units 10 (the projection units 10d and 10h in FIG. 1) that project patterns on the rear of the vehicle 10 may be installed in a vehicle body rear surface. Specifically, the projection units 10 may be provided at the periphery of brake lights (e.g., upper, lower, left, and right sides of the brake lights), at the periphery of a license plate (e.g., upper, lower, left, and right sides of the license plate), or the center portion of the vehicle body rear surface, for example. Moreover, left rear and right rear projection patterns may be projected from a single projection unit 10.

In addition, the projection units 10 may be arranged as appropriate at such positions that desired projection patterns can be projected.

FIG. 2 is a schematic view showing examples of the projection patterns. FIG. 3 is a schematic view showing examples of a scene where the projection patterns are projected.

In the present embodiment, a plurality of projection modes is selected in accordance with a situation where the vehicle 1 operates and projection patterns 2 according to the projection mode are projected. In FIGS. 2A to 2D, projection patterns 2 projected on respective projection modes, i.e., a normal driving mode, a low-speed driving mode, a reverse mode, and a parking mode are schematically shown.

The plurality of projection modes excluding the parking mode is modes on which the vehicle 1 travels actually. On such a mode on which the vehicle 1 travels (FIGS. 2A to 2C), linearly extending line patterns 3 are used as the projection patterns 2. Thus, the projection patterns 2 include linear patterns (line patterns 3). The line patterns 3 are consecutive band-like patterns, for example. Alternatively, the line patterns 3 may be configured by arranging small patterns at constant intervals linearly.

Such line patterns 3 can be used to indicate behaviors of the traveling vehicle 1. This point will be described later in detail.

In the present embodiment, the line patterns 3 include linear first patterns projected on the front in a traveling direction 4 of the vehicle 1 and linear second patterns projected on the rear in the traveling direction 4.

In FIGS. 2A to 2C, the arrow indicating the traveling direction 4 of the vehicle 1 is schematically shown. The size of the arrow indicates the speed of the vehicle 1. Patterns projected on the front in this traveling direction 4 are the first patterns and patterns projected on the rear are the second patterns.

Moreover, in the present embodiment, third patterns (middle lines 3*b* to be described later) projected on a peripheral road surface of the center portion of the vehicle 1 (road surface ranging from below the vehicle 1 to the lateral sides) are used.

As will be described later, the projection apparatus 100 calculates each of predicted trajectories 5 on which the vehicle 1 is predicted to pass and passing trajectories 6 on which the vehicle 1 has passed. The predicted trajectories 5 and the passing trajectories 6 are indicated with the first patterns and the second patterns. That is, the first patterns are generated as the line patterns 3 indicating the predicted trajectories 5 of the vehicle 1 and the second patterns are generated as the line patterns 3 indicating the passing trajectories of the vehicle 1.

Hereinafter, the normal driving mode, the low-speed driving mode, and the reverse mode on which the line patterns 3 are used and the parking mode on which the patterns other than the line patterns 3 are used will be each described.

FIG. 2A shows an example of the projection patterns 2 projected on the normal driving mode. The upper and lower diagrams of FIG. 2A are schematic views as the vehicle 1 is viewed from the lateral side and from above.

Here, the normal driving mode refers to, for example, a projection mode selected when the vehicle 1 is traveling forward as normal without slowdown. The normal driving mode is selected, for example, when the vehicle 1 travels at a speed lower than a general slowdown speed (e.g., lower than 10 km per hour). Therefore, the normal driving mode is used during forward travel on a travel lane, which is different from travel where slowdown is required, such as a stopping operation, a right turn operation, a left turn operation, and a parking operation.

On the normal driving mode, as the projection patterns 2, three types of line patterns 3 of front lines 3*a*, middle lines 3*b*, and rear lines 3*c* are projected. The respective lines 3*a* to 3*c* are configured as a pair of lines patterns 3 projected on the left and right sides of the vehicle.

The front lines 3*a* are line patterns 3 projected on the road surface at the front of the vehicle 1. The left and right front lines 3*a* are projected from, for example, the projection units 10*a* and 10*e* shown in FIG. 1.

The middle lines 3*b* are line patterns 3 projected on the road surface on the lateral sides from below the vehicle 1. The left middle line 3*b* projected from, for example, the projection units 10*b* and 10*c* and the right middle line 3*b* is projected from, for example, the projection units 10*f* and 10*g*.

The rear lines 3*c* are line patterns 3 projected on the road surface at the rear of the vehicle 1. The rear lines 3*c* on the left and right sides are projected from, for example, the projection units 10*d* and 10*h*.

It should be noted that the correspondence between the respective lines 3*a* to 3*c* and the projection unit 10 is not limited to the above-mentioned example, and for example, a configuration in which two projection units 10 are used to project a single line pattern 3 can also be employed.

As described above, the line patterns 3 shown in FIG. 2A are projected during the forward travel of the vehicle 1.

Thus, on the normal driving mode, the front lines 3*a* are linear first patterns projected on the front in the traveling direction of the vehicle 1 and are generated as line patterns

3 indicating the predicted trajectories 5 of the vehicle 1. Specifically, the linear shapes of the front lines 3*a* are set to indicate the predicted trajectories 5 of the front wheels of the vehicle 1.

Moreover, on the normal driving mode, the rear lines 3*c* are linear second patterns projected on the rear in the traveling direction of the vehicle 1 and are generated as line patterns 3 indicating the passing trajectories 6 of the vehicle 1. Specifically, the linear shapes of the rear lines 3*c* are set to indicate the passing trajectories 6 of the rear wheels of the vehicle 1.

Moreover, on the normal driving mode, the middle lines 3*b* (third patterns) are used as linear lights that light up both sides of the center portion of the vehicle 1.

FIG. 3A schematically shows a scene where the normal driving mode is applied. Here, the front lines 3*a* indicating the predicted trajectories 5, the rear lines 3*c* indicating the passing trajectories 6, and the middle lines 3*b* serving as linear lights are respectively projected on the peripheral road surface of the vehicle 1 traveling on the travel lane at a relatively high speed.

In this manner, the line patterns 3 indicating the predicted trajectories 5, the passing trajectories 6, and the like are projected on the periphery of the vehicle 1. Accordingly, it is possible to explicitly represent a traveling direction and a past traveling path of the vehicle 1 to pedestrians outside the vehicle, drivers of other vehicles, and the like and to add a favorable visual effect to the traveling vehicle 1.

FIG. 2B shows an example of the projection patterns 2 projected on the low-speed driving mode. The upper and lower diagrams of FIG. 2B are schematic views as the vehicle 1 is viewed from the lateral side and from above.

Here, the low-speed driving mode refers to, for example, a projection mode selected when the vehicle 1 is traveling forward while slowing down. Therefore, the low-speed driving mode is used during, for example, travel where slowdown is required, such as a stopping operation, a right turn operation, a left turn operation, and a parking operation.

On the low-speed driving mode, as on the above-mentioned normal driving mode, the three types of line patterns 3, i.e., the front lines 3*a*, the middle lines 3*b*, and the rear lines 3*c* are projected as the projection patterns 2.

The line patterns 3 shown in FIG. 2B are projected during the forward travel of the vehicle 1 as in FIG. 2A.

Thus, on the low-speed driving mode, the front lines 3*a* are linear first patterns projected on the front in the traveling direction of the vehicle 1 and are generated as line patterns 3 indicating the predicted trajectories 5 of the vehicle 1. Specifically, the linear shapes of the front lines 3*a* are set to indicate the predicted trajectories 5 of the front wheels of the vehicle 1.

Moreover, on the low-speed driving mode, the rear lines 3*c* are linear second patterns projected on the rear in the traveling direction of the vehicle 1 and are generated as line patterns 3 indicating the passing trajectories 6 of the vehicle 1. Specifically, the linear shapes of the rear lines 3*c* are set to indicate the passing trajectories 6 of the rear wheels of the vehicle 1.

Moreover, on the low-speed driving mode, the middle lines 3*b* (third patterns) are generated as line patterns 3 indicating the predicted trajectories 5 of the vehicle 1. Specifically, the middle lines 3*b* have the linear shapes set to indicate the predicted trajectories 5 of the rear wheels of the vehicle 1.

Accordingly, it is possible to clearly indicate to pedestrians and the like trajectories on which the rear wheels are predicted to pass when the vehicle 1 moves forward slowly.

Accordingly, it is possible to lower turn crash danger in a case of the right/left turn, for example.

FIG. 3B schematically shows a driving status of a vehicle 1*a* in a parking area as an example of a scene where the low-speed driving mode is applied. The vehicle 1*a* moves forward and gets out of the parking space on the right side in the figure. In this manner, when the vehicle 1*a* that has stopped moves forward, the low-speed driving mode is used because it is slowdown driving.

Here, the front lines 3*a* indicating the predicted trajectories 5 of the front wheels the front lines 3*a* indicating the predicted trajectories 5 of the front wheels and the middle lines 3*b* indicating the predicted trajectories 5 of the rear wheels are respectively projected on the peripheral road surface of the vehicle 1*a*. It should be noted that in FIG. 3B, the illustrations of the rear lines 3*c* indicating the passing trajectories 6 of the rear wheels of the vehicle 1*a* are omitted.

In this manner, the line patterns 3 indicating the predicted trajectories 5 of the front wheels and the rear wheels or the like are projected on the periphery of the vehicle 1*a*. Accordingly, it is possible to call attention of pedestrians and sufficiently avoid the occurrence of accidents such as turn crash and contact.

Moreover, the front lines 3*a* may be set to indicate the vehicle width of the vehicle 1. For example, the distance between the right and left lines is set to be the maximum width of the vehicle body of the vehicle 1. This can prompt the driver to make a handle operation considering the vehicle width, for example.

FIG. 2C shows an example of the projection patterns 2 projected on the reverse mode.

Here, the reverse mode is a projection mode selected when the vehicle 1 is traveling backward (back travel). The reverse mode is used, for example, in a case of parking by moving backward in a parking operation, for example.

On the reverse mode, the three types of line patterns 3, i.e., the front lines 3*a*, the middle lines 3*b*, and the rear lines 3*c* are projected as the projection patterns 2 as on the above-mentioned driving modes.

The line patterns 3 shown in FIG. 2C are projected during the backward travel of the vehicle 1.

Thus, on the reverse mode, the front lines 3*a* are linear second patterns projected on the rear in the traveling direction of the vehicle 1. In this case, the front lines 3*a* are generated as line patterns 3 indicating the passing trajectories 6 of the vehicle 1. Specifically, the linear shapes of the front lines 3*a* are set to indicate the front wheels of the passing trajectories 6 of the vehicle 1.

Moreover, on the reverse mode, the rear lines 3*c* are linear first patterns projected on the front in the traveling direction of the vehicle 1. In this case, the rear lines 3*c* are generated as line patterns 3 indicating the predicted trajectories 5 of the vehicle 1. Specifically, the linear shapes of the rear lines 3*c* are set to indicate the predicted trajectories 5 of the rear wheels of the vehicle 1.

Moreover, on the reverse mode, the middle lines 3*b* (third patterns) are generated as line patterns 3 indicating the predicted trajectories 5 of the vehicle 1. Specifically, the middle lines 3*b* are set so that the linear shapes indicate the predicted trajectories 5 of the front wheels of the vehicle 1.

Accordingly, it is possible to clearly indicate to pedestrians and the like trajectories on which the front wheels are predicted to pass when the vehicle 1 moves backward. Accordingly, it is possible to lower turn crash danger in a case of parking, for example.

FIG. 3B schematically shows a driving status of the vehicle 1*b* in a parking area as an example of a scene where the reverse mode is applied. The vehicle 1*b* moves backward for parking in the parking space on the left side in the figure.

Here, the rear lines 3*c* indicating the predicted trajectories 5 of the rear wheels and the middle lines 3*b* indicating the predicted trajectories 5 of the front wheels are respectively projected on the peripheral road surface of the vehicle 1*b*. It should be noted that in FIG. 3B, the front lines 3*a* indicating the passing trajectories 6 of the front wheels of the vehicle 1*b* are omitted.

Since the line patterns 3 indicating the predicted trajectories 5 of the front wheels and the rear wheels or the like are projected on the periphery of the vehicle 1*b* as described above, it is possible to sufficiently avoid the occurrence of an accident such as turn crash and contact during back driving.

Moreover, the rear lines 3*c* may be set to indicate the vehicle width of the vehicle 1 as in the case of the forward movement operation. Accordingly, the driver can perform back driving or the like while checking the vehicle width.

FIG. 2D shows an example of the projection patterns 2 projected on the parking mode.

Here, the parking mode is a projection mode selected in a case where the shift position of the vehicle 1 is parking ("P"), i.e., in a case where the vehicle 1 has stopped.

On the parking mode, the above-mentioned line patterns 3 are not displayed and the lighting pattern (hereinafter, referred to as stopping patterns 7) to surround the entire periphery of the vehicle 1 are projected as the projection patterns 2. Here, a front light 7*a*, a lateral side light 7*b*, and a rear light 7*c* are used as the stopping patterns 7. The respective lights 7*a* to 7*c* are gradation patterns whose colors become lighter as they come away from the vehicle 1. It should be noted that the design and the like of the stopping patterns 7 are not limited.

In this manner, the projection patterns 2 include the stopping patterns 7 different from the line patterns 3. In the present embodiment, the stopping patterns 7 are other exemplary patterns.

The use of the stopping patterns 7 can represent, to pedestrians outside the vehicle and the like, that the vehicle 1 has set the shift position to be the parking and stopped, i.e., that the vehicle 1 is stationary. Accordingly, for example, pedestrians and other vehicles can pass through the periphery of the vehicle 1 without anxiety.

It should be noted that the present technology is not limited to the above-mentioned projection modes, and other modes may be set. For example, a welcome light mode for displaying a predetermined lighting pattern when the driver unlocks the vehicle 1 with a key, opens the door, or starts the engine, for example, may be set.

Figure 4:
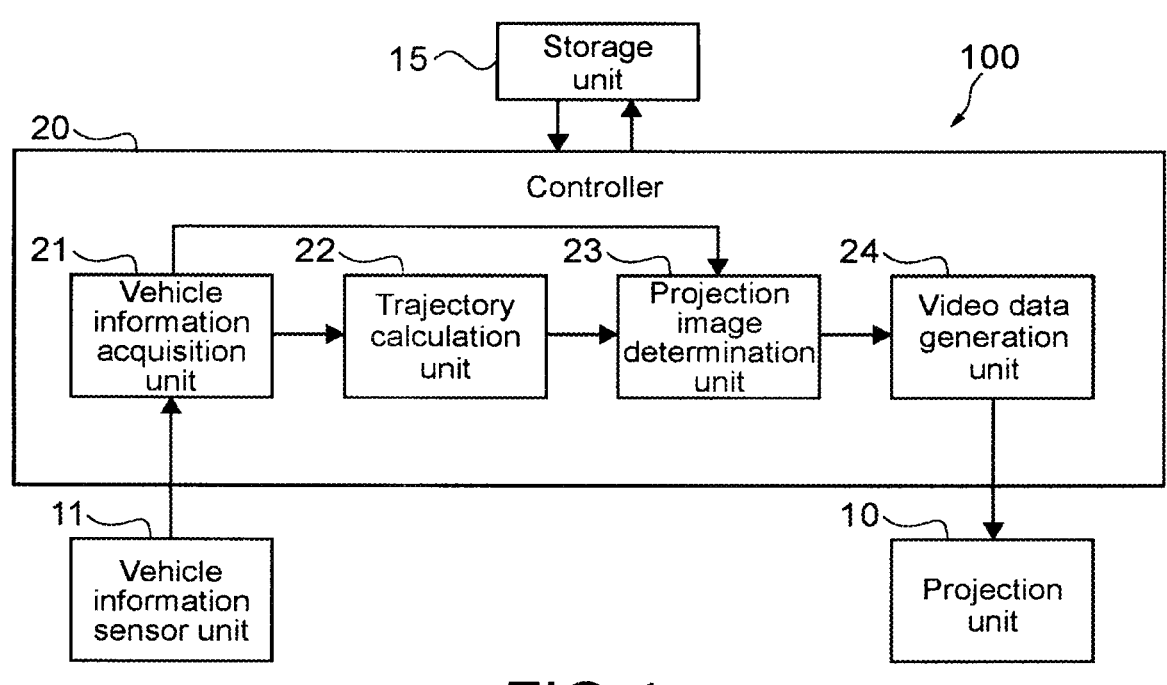
FIG. 4 A block diagram showing a configuration example of the projection apparatus according to the first embodiment.

FIG. 4 is a block diagram showing a configuration example of the projection apparatus 100 according to the first embodiment.

In the projection apparatus 100, the display of the above-mentioned various projection patterns 2 is controlled on the basis of speed-related information regarding the speed of the vehicle 1. That is, adjustment or the like of the projection patterns 2 is performed using information about a speed of the vehicle 1, a change in speed (acceleration), or accelerator operation and brake operation to change the speed of the vehicle 1, and the like.

The projection apparatus 100 includes the above-mentioned projection unit 10, a vehicle information sensor unit 11, a storage unit 15, and a controller 20.

The projection unit 10 is an element that emits light and projects the projection patterns 2. The projection unit 10 is configured to change the shapes, colors, and the like of the projection patterns 2.

For example, a projector that emits laser light as irradiation light is used as the projection unit 10. The use of laser light enables the projection patterns 2 to be displayed with high luminance at a long distance. It should be noted that an LED light source, a lamp light source, or the like may be used other than the laser light source.

A method for modulating the irradiation light is not limited. For example, a light modulator using a transmissive liquid-crystal panel, micro electro mechanical systems (MEMS), or the like is used. Moreover, combining a phase modulation element and the like using a reflective liquid-crystal panel or the like realizes projection so as to concentrate light within a predetermined range. Accordingly, the luminance of the projection patterns 2 can be increased greatly.

In addition, a specific configuration of the projection unit 10 is not limited. For example, a projection light, a laser light source, or the like capable of modulating the irradiation light may be used.

The vehicle information sensor unit 11 has a sensor that detects information regarding statuses of the respective parts of the vehicle 1.

Specifically, a steering-angle sensor that detects a steering angle of the handle, a speed sensor that detects a traveling speed of the vehicle 1, an acceleration sensor that detects an acceleration added to the vehicle 1 are provided.

Moreover, the vehicle information sensor unit 11 has an accelerator opening degree sensor that detects an opening degree of the accelerator and a brake opening degree sensor that detects an opening degree of the brake (braking level).

Moreover, the vehicle information sensor unit 11 has an accelerator pedal pressure sensor (see FIG. 6) that detects a pressure of pressing on the accelerator pedal (operation force of the accelerator) and a brake pedal pressure sensor that detects a pressure of pressing on the brake pedal (operation force of the brake). These pressure sensors may be sensors that detect a general pressure value added to the pedal or may be sensors that detect a pressure distribution.

Moreover, the vehicle information sensor unit 11 has a shift position sensor that detects a position of a gear shift (shift position) and a parking brake sensor that detects on/off of a parking brake.

Moreover, an ignition sensor that detects on/off of an ignition switch, a signal light sensor that detects on/off of signal lights, a hazard sensor that detects on/off of hazard lights, a light sensor that detects on/off of the head lights and switching between high beam/low beam (headlight flashing), and the like may be provided.

In addition, an arbitrary sensor that detects information about the vehicle 1 may be used as the vehicle information sensor unit 11.

The storage unit 15 is a nonvolatile storage device. For example, a recording medium using a solid-state element such as a solid-state drive (SSD) or a magnetic recording medium such as a hard disk drive (HDD) is used as the storage unit 15. In addition, the type and the like of the recording medium used as the storage unit 15 are not limited. For example, any recording medium for recording non-transitory data may be used.

The storage unit 15 stores a control program for controlling a general operation of the projection apparatus 100. The control program corresponds to a program according to the present embodiment. Moreover, the storage unit 15 functions as a computer-readable recording medium on which the program has been recorded.

Moreover, the storage unit 15 stores specification data for specifying the shapes, colors, and the like of the projection patterns 2. In addition, the type and the like of the data stored in the storage unit 15 are not limited, and any data required for the operation of the projection apparatus 100 may be stored.

The controller 20 controls operations of the respective blocks of the projection apparatus 100. The controller 20 has hardware configurations required for a computer, such as a CPU and a memory (RAM, ROM), for example. By the CPU loading the control program stored in the storage unit 15 to the RAM and executing it, various types of processing are executed. The controller 20 functions as an information processing apparatus according to the present embodiment.

For example, a programmable logic device (PLD) such as a field programmable gate array (FPGA) or another device such as an application specific integrated circuit (ASIC) may be used as the controller 20. Moreover, for example, a processor such as a graphics processing unit (GPU) may be used as the controller 20.

In the present embodiment, by the CPU of the controller 20 executing the program according to the present embodiment, a vehicle information acquisition unit 21, a trajectory calculation unit 22, a projection image determination unit 23, and a video data generation unit 24 are realized as functional blocks. Then, these functional blocks execute an information processing method according to the present embodiment. It should be noted that dedicated hardware such as an integrated circuit (IC) may be used as appropriate in order to realize the respective functional blocks. Moreover, these functional blocks may be realized by, for example, another computer capable of communicating with the controller 20.

The vehicle information acquisition unit 21 acquires information about the vehicle 1 (vehicle information) detected by the respective sensors of the vehicle information sensor unit 11.

In the present embodiment, the vehicle information acquisition unit 21 acquires speed-related information regarding the speed of the vehicle 1. The speed-related information contains information indicating a speed of the vehicle 1 and acceleration/deceleration that changes with the speed and information regarding an operation (accelerator operation/brake operation) that changes their physical quantities.

Speed information indicating the speed of the vehicle 1 and acceleration information indicating the acceleration of the vehicle 1 are acquired as the speed-related information. For example, detection results of the speed sensor and the acceleration sensor are read as the speed information and the acceleration information.

Moreover, accelerator information and brake information are acquired as the speed-related information. The accelerator information of them contains an opening degree of the accelerator and a pressure of pressing on the accelerator pedal (operation force of the accelerator). The brake information contains the opening degree of the brake and the pressure of pressing on the brake pedal (operation force of the brake). For example, detection results of the accelerator opening degree sensor and the accelerator pedal pressure sensor are read as the opening degree and operation force of the accelerator. Moreover, detection results of the brake opening degree sensor and the brake pedal pressure sensor are read as the opening degree of the brake and the operation force.

Moreover, the vehicle information acquisition unit 21 acquires traveling status information regarding a traveling status of the vehicle 1. Gear shift information and parking brake information are acquired as the traveling status information. The gear shift information of them contains information indicating a status of the shift position of the vehicle 1. Moreover, the parking brake information contains information indicating a status of the parking brake of the vehicle 1. For example, detection results of the shift position sensor and the parking brake sensor are read as the gear shift information and the parking brake information.

Moreover, the vehicle information acquisition unit 21 acquires steering angle information indicating a steering angle of the handle. For example, a detection result of the steering-angle sensor is read as the steering angle information.

In addition, detection results of the respective sensors that constitute the vehicle information sensor unit 11 are acquired as appropriate.

In the present embodiment, the vehicle information acquisition unit 21 corresponds to an acquisition unit.

The trajectory calculation unit 22 calculates the predicted trajectories 5 and the passing trajectories 6 of the vehicle 1 (see FIGS. 2 and 3).

In the present embodiment, the trajectory calculation unit 22 estimates the predicted trajectories 5 on which the vehicle 1 is predicted to pass on the basis of the steering angle information, the speed information, and the acceleration information of the vehicle 1. Here, for example, the trajectories of the front wheels (or the rear wheels) that are predicted in a case where the vehicle 1 goes forward at current steering angle, speed, and acceleration are estimated. At that time, correction may be made as appropriate in accordance with centrifugal force, wheel-gripping force, and the like.

It should be noted that for example, a trajectory of the center of the vehicle 1 may be estimated instead of the predicted trajectories 5 of the wheels.

A method of estimating the predicted trajectories 5 is not limited. For example, techniques such as trajectory prediction used for self-driving and the like can be applied.

Moreover, in the present embodiment, the passing trajectories 6 on which the vehicle 1 has passed are calculated by recording behaviors of the vehicle 1. Here, the passing trajectories 6 of the front wheels (or the rear wheels) are calculated from the records of the steering angle, speed, and acceleration of the vehicle 1. For example, techniques such as dead reckoning can be used for this processing. Alternatively, GPS position measurement, Wi-Fi position measurement, and the like may be used.

Alternatively, for example, recorded predicted trajectories 5 may be used as the passing trajectories 6.

A method of estimating the passing trajectories 6 is not limited. For example, any processing capable of reproducing the trajectories of the vehicle 1 may be used.

In the present embodiment, the trajectory calculation unit 22 functions as a predicted trajectory calculation unit and a passing trajectory calculation unit.

The projection image determination unit 23 determines display contents and display parameters of the projection patterns 2 and outputs data about the projection patterns 2. This processing is processing of controlling the display of the projection patterns 2.

In the projection apparatus 100, the projection image determination unit 23 controls, on the basis of the speed-related information, the display of the projection patterns 2 projected on the peripheral road surface of the vehicle 1 from the projection unit 10 mounted on the vehicle 1.

For example, in accordance with the speed-related information, processing of setting specific display parameters of the projection patterns 2 or the like is performed. In this processing, typically, display parameters (e.g., color, width, length, and blinking) of the line patterns 3 (see FIGS. 2A to 2C) of the projection patterns 2 are set.

In the present embodiment, the projection image determination unit 23 controls the display parameters of the line patterns 3 in accordance with at least one of the accelerator operation or the brake operation of the vehicle 1.

For example, when the accelerator operation/brake operation of the vehicle 1 is performed, the speed or acceleration of the vehicle 1 changes. Information indicating such a change in behaviors of the vehicle 1 is acquired as the speed-related information and the display of the line patterns 3 is adjusted in accordance with its content. Accordingly, it is possible to present to people outside the vehicle a behavior of whether the vehicle 1 will accelerate or decelerate as the line patterns 3.

Moreover, the projection image determination unit 23 controls the shapes of the line patterns 3 to indicate the trajectories (predicted trajectories 5 and passing trajectories 6) of the vehicle 1 calculated by the trajectory calculation unit 22.

Specifically, the projection image determination unit 23 generates first patterns indicating the predicted trajectories 5. For example, in a case where the vehicle 1 travels forward (travels backward), the shapes of the front lines 3a (the rear lines 3c) that are the first patterns are set to be shapes along the predicted trajectories 5.

Moreover, the projection image determination unit 23 generates second patterns indicating the passing trajectories 6. For example, in a case where the vehicle 1 travels forward (travels backward), the shapes of the rear lines 3c (the front lines 3a) that are the second patterns are set to be shapes along the passing trajectories 6.

Moreover, a distance between the left and right lines of the front lines 3a (or the rear lines 3c) may be set to indicate the vehicle width of the vehicle.

In the present embodiment, the projection image determination unit 23 corresponds to a projection control unit.

The video data generation unit 24 generates video data to be output to each projection unit 10 on the basis of the data about the projection patterns 2 output from the projection image determination unit 23.

For example, a frame image indicating the shapes of the projection patterns 2 as viewed from above the vehicle 1 is generated. Processing of correcting a distortion, deviated brightness, and the like caused due to projection is performed on this frame image in accordance with the projection angle or the like of each projection unit 10. A series of frame images whose distortions and the like have been corrected in this manner is the video data.

In addition, any image processing or the like for projecting the projection patterns 2 may be performed as appropriate.

Figure 5:
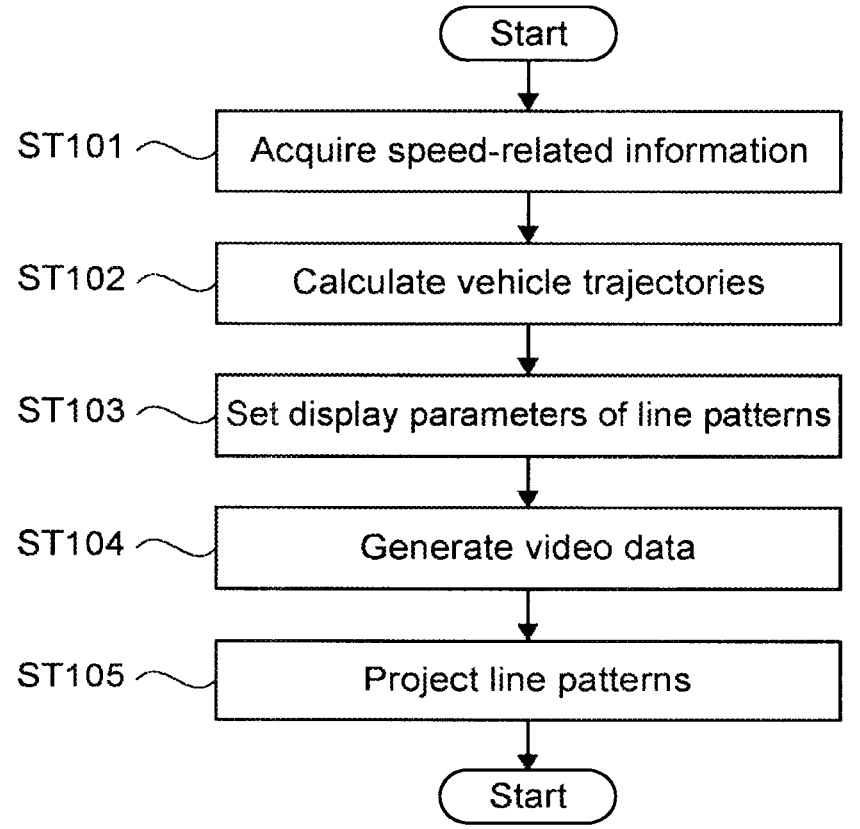
FIG. 5 A flowchart showing a basic operation example of the projection apparatus.

FIG. 5 is a flowchart showing a basic operation example of the projection apparatus 100. The processing shown in FIG. 5 is, for example, loop processing performed repeatedly during the operation of the projection apparatus 100. Here, display control on the projection mode (the normal driving mode, the low-speed driving mode, the reverse mode) on which the line patterns 3 are projected as the projection patterns 2 will be described.

First of all, the vehicle information acquisition unit 21 acquires speed-related information (Step 101).

Specifically, the speed information, the acceleration information, the accelerator information (the position and the operation force of the accelerator), and the brake information (the position and the operation force of the brake) are read from the sensors provided in the respective parts of the vehicle 1 as the speed-related information.

Moreover, the traveling status information (the gear shift the information, the parking brake the information), and the steering angle information or the like are also read at that time.

Next, the trajectory calculation unit 22 calculates the trajectories (predicted trajectories 5 and passing trajectories 6) of the vehicle 1 (Step 102).

For example, as shown in FIGS. 2A and 2B, on the projection mode (the normal driving mode, the low-speed driving mode) used during the forward travel, the predicted trajectories 5 of the front wheels of the vehicle 1 and the passing trajectories 6 of the rear wheels are calculated.

On the other hand, as shown in FIG. 2C, on the projection mode (the reverse mode) used during the backward travel, the front wheels of the passing trajectories 6 of the vehicle 1 and the predicted trajectories 5 of the rear wheels are calculated.

It should be noted that processing of calculating the predicted trajectories 5 in accordance with the steering angle or the like may be performed during the parking mode. Alternatively, the trajectory does not need to be calculated during the parking mode.

Next, the projection image determination unit 23 determines projection patterns 2 (Step 103).

Specifically, the lengths of the line patterns 3 are adjusted in accordance with the speed (the speed information) of the vehicle.

Moreover, the widths of the line patterns 3 are adjusted in accordance with the opening degree of the accelerator or the opening degree of the brake.

In addition, the colors of the line patterns 3 may be adjusted or the presence/absence of blinking or the like may be set in accordance with the speed or acceleration of the vehicle 1 or the like.

In this manner, in the present embodiment, display parameters of at least one of lengths, widths, colors, or blinking of the line patterns 3 are controlled.

It should be noted that the shapes of the line patterns 3 are set as appropriate to indicate the predicted trajectories 5 and the passing trajectories 6 as described above.

Next, the video data generation unit 24 generates video data to be output to each projection unit 10 on the basis of the data about the line patterns 3 (Step 104). For example, a frame image indicating the line patterns 3 is generated. The video data is generated by performing correction processing according to the projection angle or the like of the projection unit 10 with respect to this frame image. The generated video data is output to each projection unit 10.

Then, each projection unit 10 provided in the vehicle 1 projects the corresponding line pattern 3 on the basis of the video data (Step 105). For example, the projection units 10a and 10e shown in FIG. 1 project front lines 3a, the projection units 10b, 10c, 10f, and 10g project middle lines 3b, and the projection units 10d and 10h project rear lines 3c.

Figure 6:
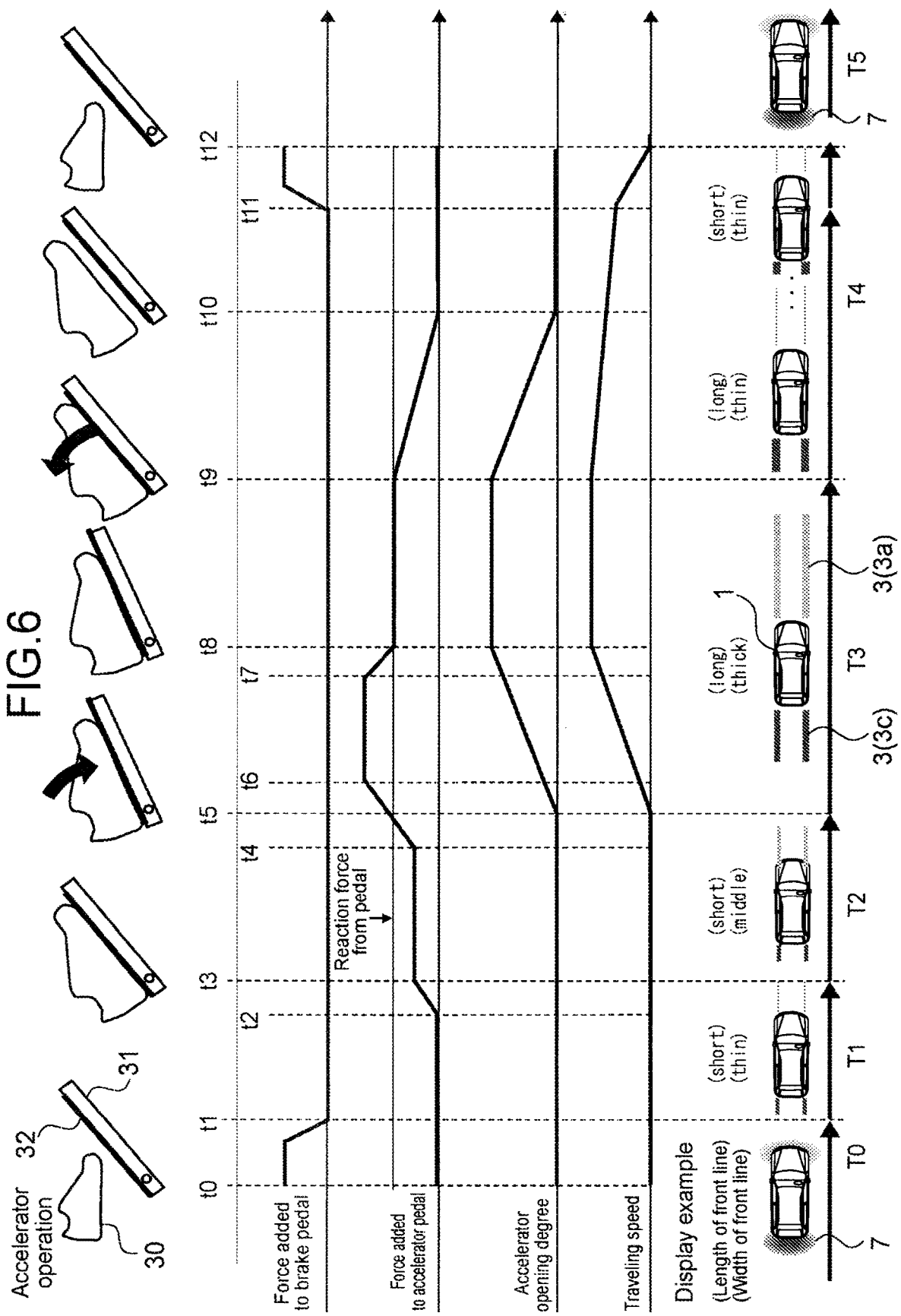
FIG. 6 A time chart showing an example of display control of a line pattern.

FIG. 6 is a time chart showing an example of the display control of the line patterns 3. Hereinafter, the display control of the line patterns 3 according to the accelerator operation will be described specifically with reference to FIG. 6.

Figures at the top part of FIG. 6 are schematic diagrams showing accelerator operations by a driver 30 at respective timings. Here, a foot of the driver 30, an accelerator pedal 31, and an accelerator pedal pressure sensor (a pressure sensor 32) are each schematically shown.

Each graph at the middle part of FIG. 6 is a schematic time chart showing a change in the speed-related information associated with the accelerator operation. Here, in order from above, a graph showing a pressure added to the brake pedal (operation force of the brake), a pressure added to the accelerator pedal (operation force of the accelerator), an opening degree of the accelerator (the driving torque), and a change over time in each parameter of the traveling speed is shown.

Figures at the bottom part of FIG. 6 are schematic diagrams showing display examples of the projection patterns 2 at the respective timings. Here, the stopping patterns 7 and the line patterns 3 (the front lines 3a and the rear lines 3c) are shown as the projection patterns 2. It should be noted that the illustrations of the middle lines 3b are omitted.

As shown at the top part of FIG. 6, the accelerator pedal 31 is provided with the pressure sensor 32 over a front surface of the pedal. This pressure sensor 32 is capable of detecting operation force of the accelerator when the driver 30 makes an accelerator operation. For example, the following statuses can be detected from this operation force: a status in which the driver 30 puts no foot on the pedal; a status in which the driver 30 puts the foot on the pedal (a status adding no force); a status in which the driver 30 is pressing the pedal by free play (a status not exceeding reaction force); a status in which the driver 30 is pressing the pedal more deeply; a status in which the driver 30 keeps the opening degree of the pedal; and a status in which the driver 30 is releasing the pedal.

Hereinafter, it is assumed that the shift position of the vehicle 1 is drive "D". Moreover, the description will be given dividing a period for changing display content and control content of the projection patterns 2 into T0 to T5.

The period T0 (times t0 to t1) is a period until the driver 30 pressing the brake pedal moves the foot off the brake pedal. At that time, the foot of the driver 30 is not in contact with the accelerator pedal 31 and the load (pressure) added to the accelerator pedal is zero.

As shown in FIG. 6, the period T0 is a period for which the speed is zero and the brake is working. This status is a status (first status) in which the vehicle 1 has stopped and the vehicle 1 does not move in accordance with an accelerator operation of the vehicle 1. In this case, the projection image determination unit 23 sets the parking mode and selects the stopping patterns 7 as the projection patterns 2. That is, in the first status, the stopping patterns 7 are projected.

The status after the time t1 is a status (second status) in which the vehicle 1 becomes movable in accordance with an accelerator operation of the vehicle 1. In this case, the projection image determination unit 23 sets the low-speed driving mode and selects the line patterns 3 as the projection patterns 2. That is, in the second status, the line patterns 3 are projected.

In FIG. 6, the line patterns 3 are radiated until the time t12 at which the vehicle 1 stops by a brake operation after the time t1.

In this manner, the parking mode is switched to the low-speed driving mode in a case where the vehicle 1 has stopped and the brake operation has not been made in the example shown in FIG. 6. It can be referred to as an example of control for switching the projection patterns 2 (the projection mode) on the basis of the brake information.

The period T1 (times t1 to t3) is a period until the driver 30 puts the foot on the accelerator pedal 31 after the status in which the driver 30 moves the foot off the brake and the accelerator. For example, when the driver 30 puts the foot on the accelerator pedal 31 at the time t2, the output of the pressure sensor 32 increases up to a pressure of just putting the foot without adding force (times t3).

It should be noted that in a case of making an accelerator operation, the opening degree of the accelerator does not change before pressing the pedal exceeding constant reaction force (the margin of the accelerator pedal 31). The pressure at the time t3 is equal to or lower than the reaction force.

In this period T1, patterns with short lengths and small widths are projected as the front lines 3a. Moreover, for example, patterns with constant lengths and widths are projected as the rear lines 3c.

The period T2 (times t3 to t5) is a period until the driver 30 opens the accelerator by pressing the accelerator pedal 31 after the driver 30 puts the foot on the accelerator pedal 31. For example, when the driver 30 presses the accelerator at the time t4, the force (load) added to the pedal increases and exceeds the reaction force at the time t5. Therefore, after the time t5, the opening degree of the accelerator increases and the movement of the vehicle 1 starts.

In this period T2, patterns with short lengths and middle widths are projected as the front lines 3a. Moreover, for example, patterns with lengths and widths similar to those of the period T1 are projected as the rear lines 3c.

In this manner, in the present embodiment, the status (period T1) in which the accelerator operation is quickly started and the status (period T2) in which the accelerator operation can be quickly started are respectively detected from the operation force of the accelerator and the widths of the front lines 3a are switched. Accordingly, it is possible to represent to pedestrians and the like present outside the vehicle whether or not the driver 30 quickly moves the vehicle 1.

The period T3 (times t5 to t9) is a period in which the vehicle 1 accelerates up to a constant speed and then travels while keeping the speed. For example, after the time t5 at which the accelerator is opened, the accelerator pedal 31 is pressed until the time t6. The force added to the pedal continues to increase. After that, the amount of pressing (the force added to the pedal) is kept until the time t7, the pedal is returned by a certain amount so as to keep the speed in the time t8. After the time t8, the force added to the pedal is balanced with the reaction force.

As shown in FIG. 6, the operation until the times t5 to t8 is transmitted to the vehicle 1 as an acceleration command. As a result, the opening degree of the accelerator and the speed of the vehicle 1 increase until the time t8.

Moreover, the operation until the times t8 to t9 is an operation of keeping the speed. Therefore, in this period, the opening degree of the accelerator and the speed of the vehicle 1 are kept.

In the projection apparatus 100, in an acceleration period until the times t5 to t8, the speed of the vehicle 1 is monitored. Then, at the time at which the speed of the vehicle 1 exceeds a predetermined threshold speed (slow-down speed), the projection mode is switched from the low-speed driving mode to the normal driving mode. In this case, for example, the middle lines 3b (not shown) are switched from the patterns indicating the predicted trajectories 5 to the lighting patterns (see FIG. 2 or the like).

This control is an example of control for switching the control content of the projection patterns 2 (the projection mode) on the basis of the speed information. Hereinafter, control on the normal driving mode will be mainly described.

In the period T3, the lengths of the front lines 3a (first patterns) are set to increase as the speed of the vehicle 1 increases (see FIG. 9). Moreover, the widths of the front lines 3a (first patterns) are set to increase as the opening degree of the accelerator increase (see FIG. 8).

As a result, as compared to the periods T1 and T2, the lengths of the front lines 3a in the period T3 increase and the widths increase.

Accordingly, the level of the speed of the vehicle 1, the level of the acceleration, or the like can be presented with respect to the front in the traveling direction of the vehicle 1.

Moreover, in the period T3, for example, the lengths and the widths of the rear lines 3c are controlled similar to the front lines 3a. That is, the lengths of the rear lines 3c (second patterns) are set to increase as the speed of the vehicle 1 increases. Moreover, the widths of the rear lines 3c (second patterns) are set to increase as the opening degree of the accelerator increase.

Accordingly, the level of the speed of the vehicle 1, the level of the acceleration, or the like can be presented also with respect to the rear in the traveling direction of the vehicle 1.

It should be noted that at the times t5 to t8, the speed of the vehicle 1 and the opening degree of the accelerator are kept. Therefore, the front lines 3a and the lengths and the widths of the rear lines 3c are also kept.

Moreover, in the period T3, fixed values may be used as the lengths and the widths of the rear lines 3c.

The period T4 (times t9 to t12) is a period until the vehicle 1 stops. For example, when the driver 30 reduces the force added to the accelerator pedal 31, the opening degree of the accelerator decreases and the speed of the vehicle 1 decreases. In FIG. 6, at the time t10, the opening degree of the accelerator becomes zero.

After the time t10, the vehicle 1 travels due to the inertial force while its speed lowers continuously. Then, the driver 30 presses the brake pedal at the time t12, and the vehicle 1 accordingly stops at the time t12.

In the example shown in FIG. 6, as in the period T4, when deceleration of the vehicle 1 (negative acceleration with respect to the traveling direction) is detected, the widths of the front lines 3a are fixed to be small values and the widths of the rear lines 3c are fixed at large values. Accordingly, the fact that the vehicle 1 decelerates can be presented to people outside the vehicle in an easy-to-understand manner.

This control is an example of control to set the front lines 3a and the widths of the rear lines 3c on the basis of deceleration (acceleration information) of the vehicle 1 or a decrease in the speed or the opening degree of the accelerator.

It should be noted that the lengths of the front lines 3a and the rear lines 3c are adjusted in accordance with the speed of the vehicle 1 as in the period T3.

In the period T5 (after time t12), the traveling vehicle 1 stops completely. At the time t12, for example, the brake pedal is pressed while the shift position is still the drive "D". In this case, the projection mode is switched to the parking mode and the stopping patterns 7 are projected as the projection patterns 2.

In this manner, in the present embodiment, the display parameters of at least the front lines 3a (first patterns) are controlled in accordance with the accelerator operation. In this case, the projection apparatus functions as an apparatus that presents an accelerator operation information. Accordingly, it is possible to represent behaviors of the vehicle 1 in an easy-to-understand manner by presenting the level of the speed of the vehicle 1, information indicating that it is during acceleration or deceleration with respect to the traveling direction of the vehicle 1. As a result, for example, it is possible to induce attention of pedestrians outside the vehicle or the like.

Moreover, the display control of the projection patterns 2 according to the accelerator operation shown in FIG. 6 may be applied when performing the brake operation. In a case of making a brake operation, it is important to represent behaviors of the vehicle 1 with respect to the rear in the traveling direction of the vehicle 1. Therefore, for example, when the vehicle 1 is moving forward (the shift position is "D") as in FIG. 6, the display parameters of the rear lines 3c (second patterns) projected at least on the rear in the traveling direction 4 are controlled.

For example, as in the control using the opening degree of the accelerator in the period T3, the widths of the rear lines 3c are set to increase as the opening degree of the brake (brake torque) increase. Moreover, the lengths of the rear lines 3c may be controlled in accordance with the speed at the time of the brake operation (at the time of the deceleration). In this case, the lengths of the rear lines 3c are set to decrease as the speed decrease. Alternatively, the lengths of the rear lines 3c may be set to increase as the speed decrease. Such control is applied to the period (e.g., the times t11 to t12) in which, for example, the vehicle 1 moving forward stops by braking.

It should be noted that the control of the line widths or the like using the opening degree of the brake may be applied to the front lines 3a.

In this manner, in the present embodiment, the display parameters of at least the rear lines 3c (second patterns) are controlled in accordance with the brake operation. In this case, the projection apparatus functions as an apparatus that presents brake operation information.

Accordingly, it is possible to represent behaviors at the time of the brake operation in an easy-to-understand manner by presenting the level of the speed of the vehicle 1, the level of the deceleration with respect to the rear in the traveling direction of the vehicle 1. As a result, for example, it is possible to induce attention of a driver of a following vehicle and the like.

Figure 7:
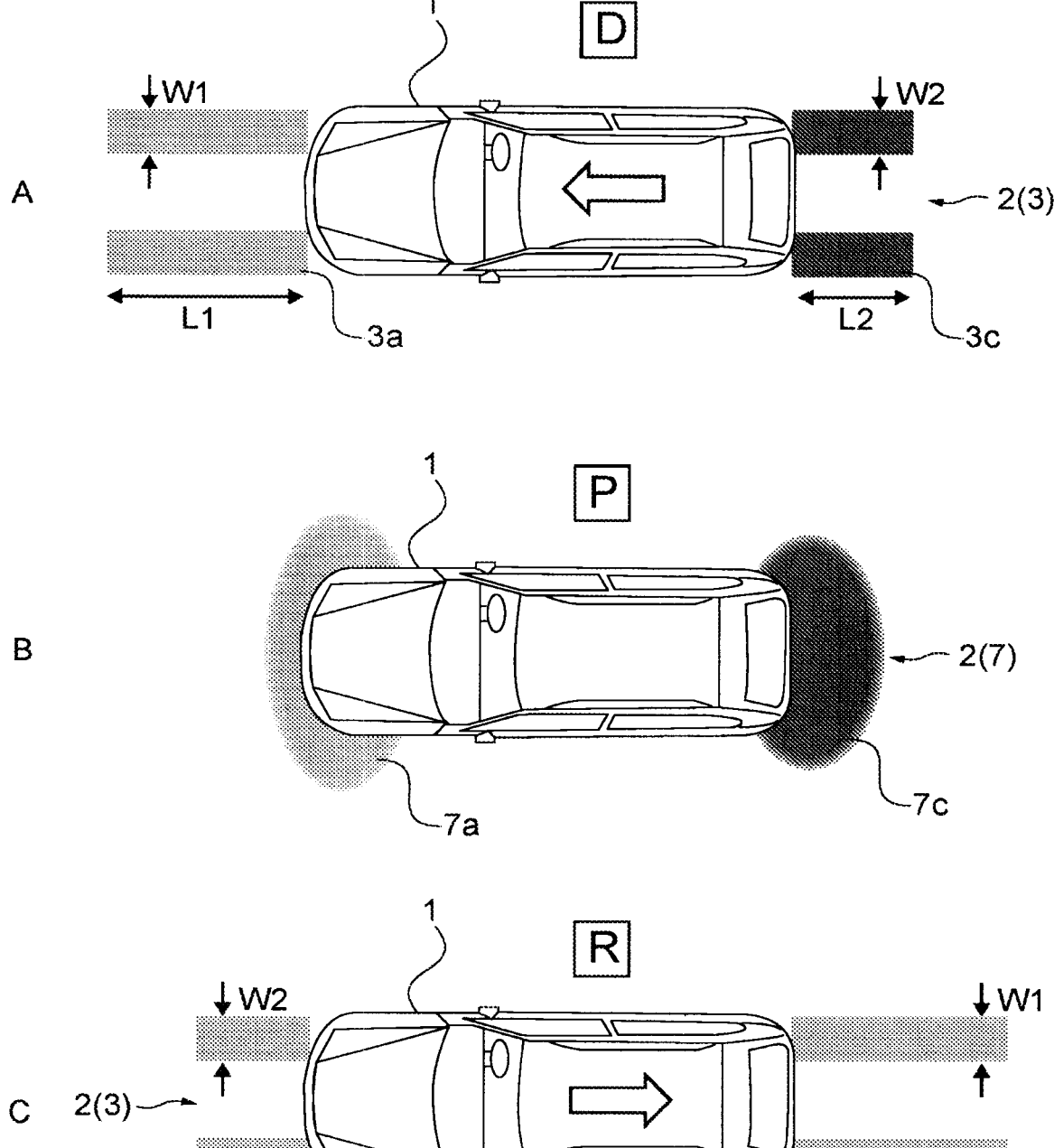
FIG. 7 A schematic view showing examples of the line pattern according to a traveling status of the vehicle 1.

FIG. 7 is a schematic view showing examples of the line patterns 3 according to the traveling status of the vehicle 1.

FIG. 7A schematically shows an example of the projection patterns 2 projected in a case where the vehicle 1 is moving forward (the shift position is "D"). These are the projection patterns 2 used on the low-speed driving mode and the normal driving mode, for example. Hereinafter, these modes will be sometimes collectively referred to as a driving mode.

In this case, the projection patterns 2 are the line patterns 3 and include the front lines 3a and the rear lines 3c. Moreover, the front lines 3a are the first patterns projected on the front in the traveling direction of the vehicle 1 and the rear lines 3c are the second patterns projected on the rear in the traveling direction of the vehicle 1.

In the example shown in FIG. 7A, the front lines 3a and the rear lines 3c are set to have colors different from each other. Setting the front and rear lines to have different colors can clearly indicate the traveling direction.

The front lines 3a are set to have a blueish color, for example. This enables the front lines 3a to be distinguished from the head lights and the brake lights, for example, and the visibility of the front lines 3a is enhanced.

The rear lines 3c are set to have a reddish color, for example. This realizes display to extend the red brake lights.

FIG. 7B schematically shows an example of the projection patterns 2 projected in a case where the vehicle 1 has stopped (the shift position is "P"). In this case, the projection patterns 2 are the stopping patterns 7. Here, the front light 7a and the rear light 7c are set to have colors different from each other.

The front light 7a is set to have a blueish color as in the front lines 3a in FIG. 7A, for example. Moreover, the rear light 7c is set to have a reddish color as in the rear lines 3c in FIG. 7A, for example. Accordingly, it is possible to reduce discomfort in switching between the driving mode and the parking mode.

FIG. 7C schematically shows an example of the projection patterns 2 projected in a case where the vehicle 1 is moving backward (the shift position is "R"). These are the projection patterns 2 used on the reverse mode, for example.

In this case, the projection patterns 2 are the line patterns 3 and include the front lines 3a and the rear lines 3c. Moreover, the front lines 3a are the second patterns projected on the rear in the traveling direction of the vehicle 1 and the rear lines 3c are the first patterns projected on the front in the traveling direction of the vehicle 1.

In the example shown in FIG. 7C, the front lines 3a and the rear lines 3c are set to have the same color. Setting the front and rear lines to have the same color can clearly indicate a difference from the driving mode, i.e., a status in which the vehicle 1 is moving backward.

The front lines 3a and the rear lines 3c are set to have a blueish color, for example. Accordingly, a color different from that of the brake lights is presented on the rear side as the traveling direction of the vehicle 1, and it is possible to represent the fact that the vehicle 1 is moving backward.

It should be noted that an arbitrary color setting can be made other than the above-mentioned settings. For example, the front and rear lines may be set to have a similar color on the driving mode or the front and rear lines may be set to have different colors on the reverse mode. Moreover, other colors such as green, violet, and orange color may be used.

Alternatively, the color or the brightness (luminance) may be adjusted so that the projection patterns 2 can be easily seen in accordance with a status of a projection target (e.g., a road surface) or an illuminance environment.

FIG. 8 is a table showing an example of width control of the line patterns 3.

Here, the widths of the line patterns 3 mean widths of lines respectively projected on the right side and the left side of the vehicle 1 (see FIG. 7). Hereinafter, the widths of the first patterns will be denoted by W1 and the widths of the second patterns will be denoted by W2.

The table of FIG. 8A shows setting examples of the widths of the first patterns according to an accelerator operation. This table shows separately a status ("Feet On" item) in which the driver 30 puts the foot on the brake pedal and the accelerator pedal and a status ("No Feet" item) in which the driver 30 puts no foot on the brake pedal. Three left columns of the table show setting examples for cases where the shift position is the parking ("P"), neutral ("N"), and drive/reverse ("D or R"), respectively.

For example, the first patterns for the drive position are the front lines 3a and the first patterns for the reverse position are the rear lines 3c.

Moreover, the first patterns for the neutral position are the line patterns 3 (the front lines 3a or the rear lines 3c) projected on the front of the traveling direction of the vehicle 1 when performing control.

It should be noted that with the neutral position, in a case where the vehicle 1 has stopped, the front lines 3a and the rear lines 3c are both control targets as the first patterns.

For example, in a case where the shift position is parking, irrespective of the opening degree of the accelerator ("Accelerator Pedal Opening") or the position of the foot of the driver 30, the projection patterns 2 are set to be the stopping patterns 7 ("Parking Sign").

Moreover, in a case where the shift position is neutral, irrespective of the opening degree of the accelerator or the position of the foot of the driver 30, the widths W1 of the line patterns 3 projected on the front in the traveling direction 4 are set to have widths of 1% assuming that the maximum line widths are 100%.

Next, setting examples for the drive position and the reverse position will be described.

As shown in FIG. 8A, in a case where the brake pedal is "Feet On" and the accelerator pedal is "No Feet", W1=1% is set. It corresponds to the status within the period T0 in FIG. 6, for example. Here, unlike the control of FIG. 6, the first patterns with the widths of 1% are projected instead of the stopping patterns 7.

Moreover, in a case where the brake pedal and the accelerator pedal are both "No Feet", W1=3% is set. It corresponds to the status within the period T1 in FIG. 6, for example.

It should be noted that in a case where the accelerator pedal is "Feet On" and the load added to the accelerator is equal to or lower than the reaction force (see the period T2 in FIG. 6), processing of increasing the widths of the first patterns may be performed.

In a case where the brake pedal is "No Feet" and the accelerator pedal is "Feet On", the widths of the first patterns are controlled in accordance with the opening degree of the accelerator. It corresponds to the status within the period T3 in FIG. 6, for example.

For example, in a case where the opening degree of the accelerator is equal to or higher than 0% and lower than 10%, W1=5% is set. Moreover, in a case where the opening degree of the accelerator is equal to or higher than 10% and lower than 20%, W1=10% is set. In the following, every time the opening degree of the accelerator increases by 10%, the widths W1 of the first patterns are set to increase by 10% each.

In this manner, in the present embodiment, the widths W1 of the first patterns are set to increase as the opening degree of the accelerator increase. Accordingly, it is possible to present the level at which the vehicle 1 accelerates in the traveling direction or the like as the widths of the line patterns 3.

It should be noted that control of the width according to the accelerator operation shown in FIG. 8A may be applied to control of the widths W2 of the second patterns projected on the rear in the traveling direction.

The table of FIG. 8B shows setting examples of the widths W2 of the second patterns according to a brake operation. This table shows separately a status in which the driver 30 puts on the foot the brake pedal ("Feet On" item) and a status in which the driver 30 puts no foot on the brake pedal ("No Feet" item). Moreover, three left columns of the table show setting examples of the respective shift positions ("P", "N", "D or R").

For example, in a case where the shift position is parking, irrespective of the opening degree of the brake ("Brake Pedal Opening") and the position of the foot of the driver 30, the projection patterns 2 are set to be the stopping patterns 7 ("Parking Sign").

Moreover, in a case where the shift position is neutral, irrespective of the opening degree of the brake and the position of the foot of the driver 30, the line patterns 3 projected on the rear in the traveling direction 4 are set to be extremely thin lines. The extremely thin lines are thin lines with the line widths of 1% or less, for example.

Next, setting examples of the drive position and the reverse position will be described.

As shown in FIG. 8B, in a case where the brake pedal is "No Feet", the second patterns are set to be extremely thin lines.

Moreover, in a case where the brake pedal is "Feet On", the widths W2 of the second patterns are controlled in accordance with the opening degree of the brake.

For example, in a case where the opening degree of the brake is equal to or higher than 0% and lower than 10%, W2 is set to be a width of an extremely thin line. Moreover, in a case where the opening degree of the brake is equal to or higher than 10% and lower than 20%, W2=10% is set. In a status in which the brake operation is reliably performed as such, the widths W2 of the second patterns changes rapidly. In the following, every time the opening degree of the brake increases by 10%, the widths W2 of the second patterns are set to increase by 10% each.

In this manner, in the present embodiment, the widths W2 of the second patterns are set to increase as the opening degree of the brake increase. Accordingly, the level at which the vehicle 1 decelerates or the like can be presented on the rear in the traveling direction as the widths of the line patterns 3.

In FIG. 8A and FIG. 8B, the display contents and the control contents of display parameters of the projection patterns 2 are changed in accordance with a status of the shift position. The present technology is not limited thereto, and the display contents and control contents may be changed referring to a status of the parking brake or the like. For example, even in the neutral status, control to project the stopping patterns 7 may be performed if the parking brake is on.

As described above, in the present embodiment, the type of the projection patterns 2, or the control contents of the display parameters of the projection patterns 2 are changed on the basis of the information (the traveling status information) of the status of the shift position or the status of the parking brake. Accordingly, it is possible to change and project appropriately the projection patterns 2 and the like appropriate to the traveling status of the vehicle 1.

FIG. 9 is a table showing an example of length control of the line patterns 3.

Here, the lengths of the line patterns 3 mean lengths of lines respectively projected on the right side and the left side of the vehicle 1 (see FIG. 7). The shapes of the line patterns 3 are straight lines or curve lines and their lengths are indicated as line lengths or circular arc lengths. Hereinafter, the lengths of the first patterns will be denoted by L1 and the lengths of the second patterns will be denoted by L2.

The table of FIG. 9A shows setting examples of the lengths L1 of the first patterns projected on the front in the traveling direction according to the speed ("Speed") of the vehicle 1. These settings may be applied, for example, both in a case where the vehicle 1 is moving forward (drive mode) and in a case where the vehicle 1 is moving backward (reverse mode).

As shown outside the table of FIG. 9A, in the present embodiment, a value obtained by adding a normal blind distance L0 for each vehicle 1 and a distance L1' is set as the length L1 of the first pattern.

Figure 10:
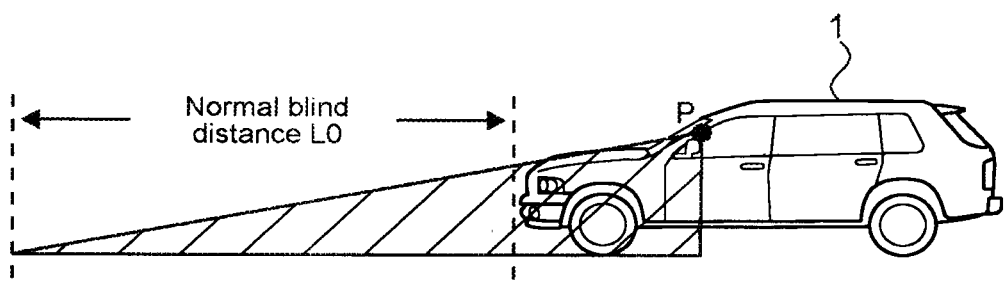
FIG. 10. A schematic view for describing a normal blind distance L0.

FIG. 10 is a schematic view for describing the normal blind distance L0.

The normal blind distance L0 is a blind distance calculated assuming a normal viewpoint position P of the driver 30 who has gotten in the vehicle 1. FIG. 10 schematically shows a blind range (in the figure, a hatched region) with respect to the front of the vehicle 1.

The normal blind distance L0 is, for example, a distance from a position (end of the blind range) where the road surface starts to be seen from the viewpoint position P to the front end of the vehicle 1. The distance L0 is a distance depending on the shape of the vehicle 1, the position of the seat, and the like. The distance L0 is calculated setting the viewpoint position P for each vehicle 1.

Moreover, by a similar method, the normal blind distance L0 with respect to the rear of the vehicle 1 can be calculated.

A setting value shown in FIG. 9A are a value of the distance L1' obtained by subtracting the normal blind distance L0 from the length L1 of the first pattern. Accordingly, the lengths L1 of the first patterns can be set as appropriate irrespective of differences in the blind spot of for each vehicle 1.

When the speed is lower than 10 km per hour, L1'=3 m is set.

When the speed is 10 km per hour or more and 20 km or less, L1'=5 m is set.

When the speed is 20 km per hour or more and 30 km or less, L1'=10 m is set.

When the speed is 30 km per hour or more and 40 km or less, L1'=18 m is set.

When the speed is 40 km per hour or more and 50 km or less, L1'=28 m is set.

When the speed is 50 km per hour or more and 60 km or less, L1'=40 m is set.

When the speed is 60 km per hour or more and 70 km or less, L1'=54 m is set.

When the speed is 70 km per hour or more and 80 km or less, L1'=72 m is set.

When the speed is 80 km per hour or more and 90 km or less, L1'=89 m is set.

When the speed is 90 km per hour or more and 100 km or less, L1'=108 m is set.

Thereafter, at the speed of 100 km per hour or more, L1'=108 m is set.

These distances are values calculated on the basis of a stopping distance of the vehicle 1 within each speed range.

The table of FIG. 9B shows setting examples of the lengths L2 of the second patterns projected on the rear in the traveling direction according to the speed ("Speed") of the vehicle 1. The length L2 is, for example, as shown in FIG. 7, a distance from a rear end of the vehicle 1 in the traveling direction to the end of the pattern.

When the speed is lower than 10 km per hour, L2=3 m is set.

When the speed is 10 km per hour or more and 20 km or less, L2=6 m is set.

When the speed is 20 km per hour or more and 30 km or less, L2=8 m is set.

When the speed is 30 km per hour or more and 40 km or less, L2=11 m is set.

When the speed is 40 km per hour or more and 50 km or less, L2=14 m is set.

When the speed is 50 km per hour or more and 60 km or less, L2=17 m is set.

When the speed is 60 km per hour or more and 70 km or less, L2=19 m is set.

When the speed is 70 km per hour or more and 80 km or less, L2=22 m is set.

When the speed is 80 km per hour or more and 90 km or less, L2=25 m is set.

When the speed is 90 km per hour or more and 100 km or less, L2=28 m is set.

Thereafter, at the speed of 100 km per hour or more, L2=28 m is set.

These distances are values calculated on the basis of a brake reaction distance of the vehicle 1 within each speed range.

In this manner, in the present embodiment, the lengths of the first patterns and the second patterns are set to increase as the speed of the vehicle 1 increases. Accordingly, for example, in a situation (e.g., twilight time, night time, rainy day) where it is difficult to catch the speed of the vehicle 1, it is possible to present the level of the speed of the vehicle 1 in an easy-to-understand manner.

It should be noted that the lengths of the line patterns 3 are not limited. For example, control to set the minimum distance below a certain speed and set a length depending on a travel distance of several seconds (e.g., three seconds) at or above that speed is also possible.

Alternatively, for example, a length indicating an optimal vehicle-to-vehicle distance at each traveling speed may be set. For doing so, the stopping distance of the vehicle 1 may be referred to as described above or statistic values or the like calculated from traffic accident data or the like may be used.

Hereinabove, in the controller 20 according to the present embodiment, the projection units 10 provided in the vehicle 1 project the projection patterns 2 on the peripheral road surface. The display of the projection patterns 2 is controlled on the basis of the speed-related information regarding the speed of the vehicle 1. Accordingly, the projection patterns 2 can be changed in accordance with behaviors of the vehicle 1, and the behaviors of the vehicle 1 can be represented to people outside the vehicle in an easy-to-understand manner.

As means for presenting a driving operation of the driver to people outside the vehicle, signal lights, a brake, and hazard lights can be used, for example. However, with that means, it is to difficult represent an operation with acceleration/deceleration, such as an accelerator operation and a brake operation, the level of the acceleration, or the like. Therefore, it is not possible for other people located around the vehicle to see whether that automobile will accelerate.

Moreover, it is also difficult to see how fast the automobile is going, and it may be difficult for pedestrians to judge whether or not they can walk across the street safely, for example. Therefore, there is a possibility that it prohibits a smooth traffic flow.

Moreover, an engine sound can be used as the means of knowing acceleration of the automobile, for example. However, it can be applied only to a case where an excessive accelerator operation is done, for example. In addition, an electric automobile (EV) is equipped with a sound output device for informing pedestrians and the like of the travel. However, it is difficult to inform of operation, speed, and the like with acceleration because it is mainly for informing of the travel of the vehicle.

In the present embodiment, the display of the projection patterns 2 is controlled on the basis of the speed-related information. For example, by controlling the display parameters of the line patterns 3 that are the projection patterns 2 in accordance with a speed or the like, it is possible to present the speed or acceleration of the vehicle 1 on the road surface. Accordingly, whether or not the vehicle 1 will accelerate or how fast the vehicle 1 is going can be represented to pedestrians outside the vehicle, drivers of other vehicles, and the like for so that they can recognize it intuitively. As a result, it is possible to induce attention to the surrounding traffic situation.

Moreover, since signs that can be visually recognized, such as the projection patterns 2, are used, a silent traffic environment can be kept as compared to a case of outputting sounds or the like artificially. Moreover, even in an environment that it is darker to view, such as night time and rainy day, the use of the projection patterns 2 can represent behaviors of the vehicle 1 reliably. As a result, the traffic accident risk can be lowered sufficiently.

Second Embodiment

A projection apparatus according to a second embodiment of the present technology will be described. Hereinafter, descriptions of portions having configurations and effects similar to those of the projection apparatus 100 described above in the above-mentioned embodiment will be omitted or simplified.

Figure 11:
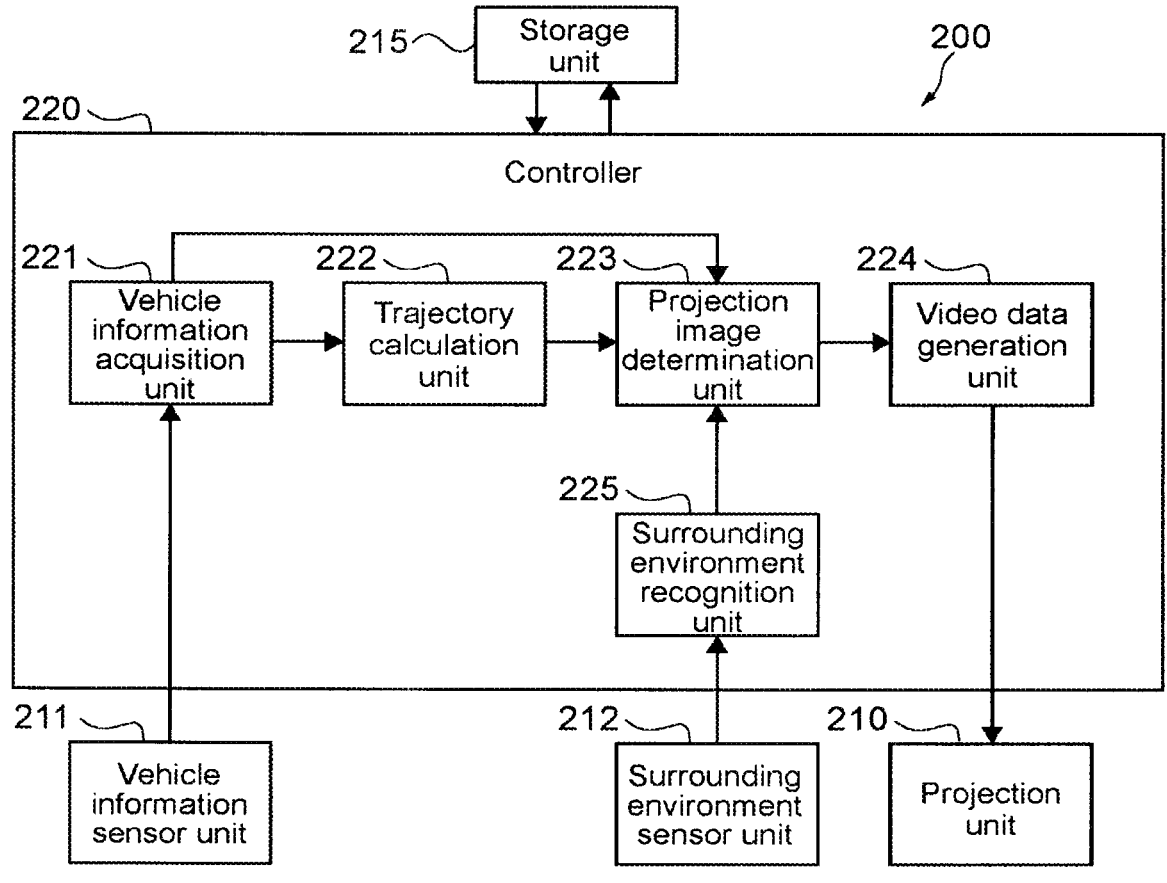
FIG. 11 A block diagram showing a configuration example of a projection apparatus according to a second embodiment.

FIG. 11 is a block diagram showing a configuration example of the projection apparatus according to the second embodiment.

In the present embodiment, the display of the second patterns projected on the rear in the traveling direction is stepwisely controlled in accordance with the brake operation level as the display control of the projection patterns 2 using the speed-related information regarding the speed of the vehicle 1.

As shown in FIG. 11, a projection apparatus 200 includes projection units 210, a vehicle information sensor unit 211, a surrounding environment sensor unit 212, a storage unit 215, and a controller 220. The projection units 210, the vehicle information sensor unit 211, and the storage unit 215 of them are, for example, configured in a manner similar to the projection unit 10, the vehicle information sensor unit 11, and the storage unit 15 shown in FIG. 4.

The surrounding environment sensor unit 212 has sensors that detect conditions of a surrounding environment of the vehicle 1.

In the present embodiment, a rear sensor for detecting an object at the rear of the vehicle 1 is provided as the surrounding environment sensor unit 212.

As the rear sensor, for example, a rear camera (rear camera) installed in the rear part of the vehicle 1 is used. The rear camera captures a scene at the rear of the vehicle 1 including the following vehicle or the like. Moreover, for example, a radar sensor, an ultrasonic sensor, a LiDAR sensor, or the like installed in the rear part of the vehicle 1 may be used as the rear sensor. These sensors detect a position or the like of an object located at the rear of the vehicle 1, such as a following vehicle.

In addition, cameras (front camera and side cameras) oriented to the front and the lateral sides of the vehicle 1, distance measurement sensors, and the like may be provided.

The controller 220 controls operations of the respective blocks of the projection apparatus 200. In the present embodiment, by the CPU of the controller 220 executing the program according to the present embodiment stored in the storage unit 215, a vehicle information acquisition unit 221, a trajectory calculation unit 222, a projection image determination unit 223, a video data generation unit 224, and a surrounding environment recognition unit 225 are realized as functional blocks.

The vehicle information acquisition unit 221, the trajectory calculation unit 222, and the video data generation unit 224 of them are, for example, configured similar to the vehicle information acquisition unit 21, the trajectory calculation unit 22, and the video data generation unit 24 shown in FIG. 4.

The projection image determination unit 223 determines the display contents and display parameters of the projection patterns 2 and outputs data about the projection patterns 2.

In the present embodiment, the projection image determination unit 223 estimates a brake operation level on the basis of a deceleration parameter and discontinuously changes the second patterns in accordance with the brake operation level.

Here, the deceleration parameter is speed-related information capable of indicating the deceleration of the vehicle 1. Specifically, at least one of deceleration of the vehicle 1 (negative acceleration with respect to the traveling direction), operation force of the brake, and an opening degree of the brake are used as the deceleration parameter.

Moreover, the brake operation level is strength of a brake operation of the driver 30.

At the projection image determination unit 223, a normal brake operation, a strong brake operation, a sudden braking operation, and the like are respectively detected from the brake operation level. Then, the display parameters of the second patterns are set to change stepwisely in accordance with these operations.

Figure 12:
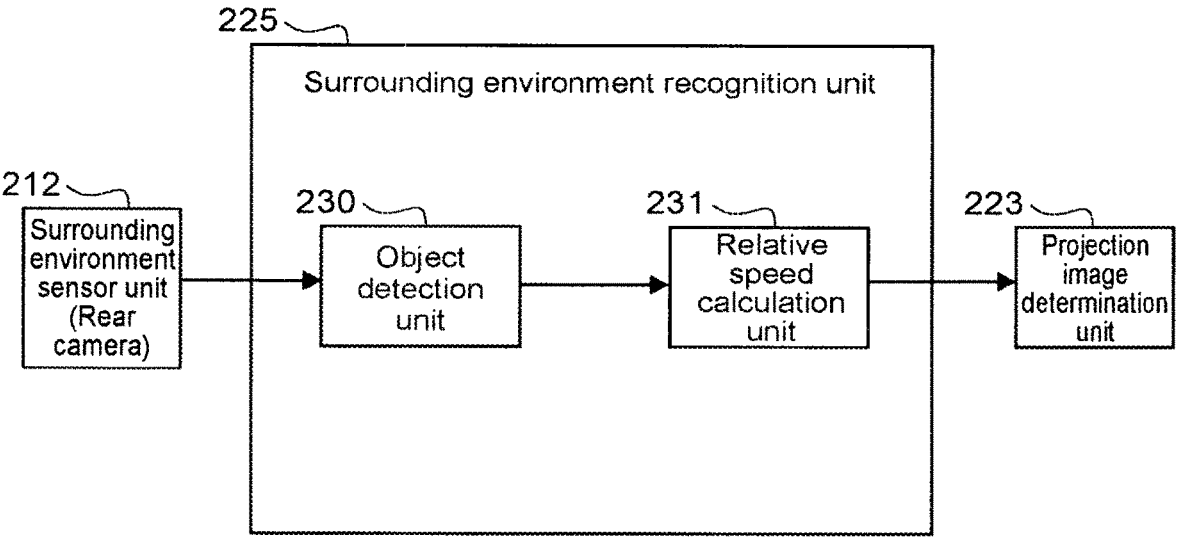
FIG. 12 A block diagram showing a configuration example of a surrounding environment recognition unit.

FIG. 12 is a block diagram showing a configuration example of the surrounding environment recognition unit 225.

The surrounding environment recognition unit 225 performs recognition processing related to the surrounding environment of the vehicle 1 on the basis of the output of the surrounding environment sensor unit 212. Then, the surrounding environment recognition unit 225 detects objects (e.g., pedestrians, other vehicles, curbs) located at the periphery of the vehicle 1 and calculates various types of information regarding the objects.

The surrounding environment recognition unit 225 includes an object detection unit 230 and a relative speed calculation unit 231.

The object detection unit 230 detects objects at the periphery of the vehicle 1 on the basis of detection results of the surrounding environment sensor unit 212. A learning device performs image recognition processing using, for example, machine learning or the like is used as the object detection unit 230.

For example, with the configuration in which the cameras are provided as the surrounding environment sensor unit 212, images captured by the cameras are input to the object detection unit 230.

In this case, using reference information generated in advance by learning, objects in the input images are detected and their attributes are determined. The reference information is, for example, dictionary information stored associating the type of object with features of object. Moreover, in a case where a deep neural network (DNN) or the like is used as the learning device, recognition model information or the like is used as the reference information. In this processing, objects at the periphery of the vehicle 1 are detected and attributes of the objects such as cars (e.g., car types including passenger cars, large-sized cars such as trucks and buss), motorcycles, bicycles, and people are determined. For example, IDs as serial numbers are applied to the detected objects, respectively.

Moreover, for each of the detected objects, a position in the image is determined. At that time, a distance (relative distance) between the position in the image and the object may be calculated.

The object detection unit 230 outputs ID information, attribute information, distance information (or position information) regarding each object. These are input to the relative speed calculation unit 231.

The relative speed calculation unit 231 calculates a relative speed of the object with respect to the vehicle 1 on the basis of the information regarding the object output from the object detection unit 230.

For example, regarding each object, a change in distance per unit time is calculated and the relative speed with respect to that vehicle (the vehicle 1) is calculated on the basis of the change in the distance.

The relative speed calculation unit 231 outputs the ID information, the attribute information, the distance information (or the position information), and the speed information regarding each object. These are input to the projection image determination unit 223.

Moreover, in a case where a radar sensor, an ultrasonic sensor, a LiDAR sensor, or the like other than the cameras is used as the surrounding environment sensor unit 212, the object detection unit 230 detects the position of the object and the distance and an ID is applied to the detected object. Then, the relative speed calculation unit 231 calculates the detected relative speed of the object. In this case, the output from the surrounding environment recognition unit 225 is the ID information, the distance information (or the position information), and the speed information of the object. It should be noted that the distance information may be information just about the distance or may be information associated with the distance.

In the present embodiment, an object at the periphery of the vehicle 1, in particular, at the rear of the vehicle 1 is detected. That is, the surrounding environment recognition unit 225 calculates following vehicle information regarding a following vehicle behind the vehicle 1 on the basis of detection results of the rear camera and the like. Thus, the surrounding environment recognition unit 225 calculates and acquires the following vehicle information. The following vehicle information contains ID information of the following vehicle, attribute information, distance information indicating a vehicle-to-vehicle distance (or position information indicating a relative position), and speed information indicating a relative speed. It should be noted that the following vehicle is a vehicle that travels following the vehicle 1 behind and includes an automobile, a motorcycle, a bicycle, and the like.

In the present embodiment, the vehicle information acquisition unit 221 and the surrounding environment recognition unit 225 described above realize the acquisition unit.

Figure 13:
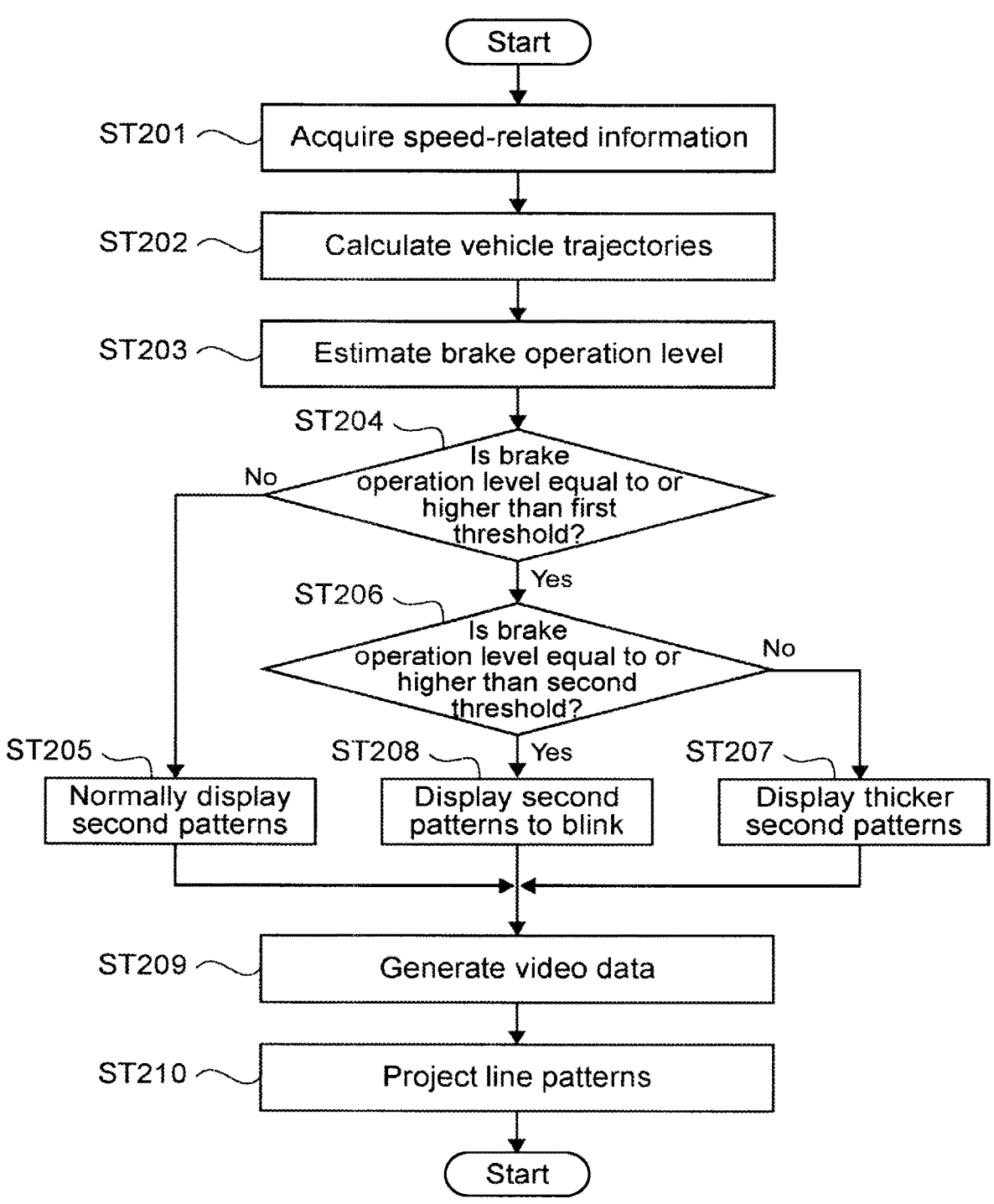
FIG. 13 A flowchart showing a basic operation example of the projection apparatus.

FIG. 13 is a flowchart showing a basic operation example of the projection apparatus 200. FIG. 14 is a schematic view showing examples of rear patterns (second patterns) according to a brake operation level.

The processing shown in FIG. 13 is, for example, a loop processing performed repeatedly during the operation of the projection apparatus 200. Moreover, this processing may be performed, in a case where the following vehicle has been detected, in a case where the relative speed of the following vehicle is high, or in a case where the vehicle-to-vehicle distance to the following vehicle is short, for example.

First of all, the vehicle information acquisition unit 221 acquires speed-related information (Step 201). After that, the trajectory calculation unit 222 calculates trajectories (predicted trajectories 5 and passing trajectories 6) of the vehicle 1 (Step 202).

Next, the projection image determination unit 223 estimates a brake operation level (Step 203).

For example, operation force of the brake (load added to the brake), an opening degree of the brake (brake torque), and a value of deceleration at the time of a brake operation and its amount of change are estimated as the brake operation level. Alternatively, the brake operation level may be estimated by combining these deceleration parameters. In addition, a method of estimating the brake operation level is not limited.

Next, whether or not the brake operation level is equal to or higher than a first threshold is determined (Step 204). The first threshold is, for example, a threshold for detecting a relatively strong brake operation. For example, a value that is about 50%, 60%, or 70% of the brake operation level estimated at the time of sudden braking is set as the first threshold. In addition, the first threshold can be set as appropriate.

In a case where the brake operation level is lower than the first threshold (No in Step 204), the projection image determination unit 223 determines to project the second patterns by normal display (Step 205). The normal display is a display method in a normal brake operation. For example, a display method of adjusting the width, a method of setting a predetermined fixed width, or the like in accordance with the opening degree of the accelerator or the brake described with reference to FIGS. 6, 8, and the like is used as the normal display.

FIG. 14A schematically shows a display example of second patterns (rear lines 3c) in the normal display. Here, the rear lines 3c with a relatively short width set are projected. Moreover, the rear lines 3c are set to be red similar to the color of brake lights 35, for example.

Referring back to FIG. 13, in a case where the brake operation level is equal to or higher than the first threshold (Yes in Step 204), whether or not the brake operation level is equal to or higher than a second threshold is determined (Step 206). The first threshold is, for example, a threshold for detecting a sudden braking operation. For example, a value that is about 80% or 90% of the brake operation level estimated at the time of sudden braking is set as the second threshold. In addition, the second threshold can be set as appropriate.

In a case where the brake operation level is smaller than the second threshold (No in Step 206), the projection image determination unit 223 determines to display the widths of the second patterns to be relatively long fixed widths (Step 205). It can be said that this method is a method of displaying the second patterns in a statically noticeable manner. For example, the widths of the second patterns are set to be the maximum widths. Alternatively, the widths of the second patterns may be set to be widths that are about 90% or 80% of the maximum widths.

FIG. 14B schematically shows a display example of the second patterns (rear lines 3c) displayed with long widths. Here, the rear lines 3c set to have longer fixed widths than those of the normal display are projected. Accordingly, since the long rear lines 3c are projected in addition to the brake lights 35, it is possible to represent a strong brake operation of the vehicle 1 to the following vehicle in a noticeable manner.

Referring back to FIG. 13, in a case where the brake operation level is equal to or higher than the second threshold (Yes in Step 206), the projection image determination unit 223 determines to project the second patterns in blinking display (Step 208).

The blinking display is a display method of displaying the second patterns to blink. It can be said that the blinking display is a method of displaying the second patterns in a dynamically noticeable manner.

FIG. 14C schematically shows a display example of the second patterns (rear lines 3c) in blinking display. In the blinking display, for example, the widths of the rear lines 3c are set to have widths equal to or larger than the fixed widths of FIG. 14B. Then, the rear lines 3c are displayed so that at least parts of the rear lines 3c blink. Moreover, in a case where the parts of the rear lines 3c blink, the portions to blink can also be displayed to move. That is, the rear lines 3c may be displayed as animation. Accordingly, the blinking rear lines 3c are projected in addition to the brake lights 35, it is possible to represent a sudden braking operation or the like of the vehicle 1 in a sufficiently noticeable manner. As a result, it is possible to effectively invoke attention to the following vehicle and the like.

Referring back to FIG. 13, in Steps 205, 207, and 208, after the display of the second patterns is set, the video data generation unit 224 generates video data to be output to each projection unit 210 on the basis of the set data (Step 209). Then, each projection unit 210 provided in the vehicle 1 projects the corresponding line pattern 3 on the basis of the video data (Step 210).

In this manner, in the present embodiment, in a case where the brake operation level is equal to or higher than a first threshold and is lower than a second threshold higher than the first threshold, the projection image determination unit 223 increases the widths of the second patterns and causes the second patterns to blink in a case where the brake operation level is equal to or higher than the second threshold.

Accordingly, it is possible to represent a case where the deceleration of the vehicle 1 is high or a case where sudden stop is expected, for example, to the following vehicle traveling outside the vehicle and the like in an easy-to-understand manner.

In the operation example shown in FIG. 13, discontinuous display control of the second patterns according to the brake operation level has been described. Instead of the brake operation level, it is also possible to discontinuously control the second patterns in accordance with the collision risk with the following vehicle.

Specifically, the projection image determination unit 223 estimates a collision risk with the following vehicle on the basis of the following vehicle information. Then, processing of stepwisely changing the display of the rear patterns (second patterns) is performed in accordance with the collision risk. This processing is, for example, processing of performing the processing shown in FIG. 13 using the collision risk with the following vehicle instead of the brake operation level.

For example, as described with reference to FIG. 12, the surrounding environment recognition unit 225 in the projection apparatus 200 calculates following vehicle information (information regarding a relative distance to the following vehicle, a relative speed, and the like). Using this following vehicle information, the collision risk is estimated (corresponding to Step 205).

The collision risk is set to be a higher value, for example, as the relative distance to the following vehicle decreases, and also as the relative speed with respect to the following vehicle is higher. As an example, the relative speed/relative distance is calculated as the collision risk. Alternatively, the collision risk may be calculated from either one of the relative distance and the relative speed. Moreover, the collision risk may be calculated referring to the brake information or the like and considering the amount of deceleration of that vehicle 1 or the like.

Moreover, the first threshold and the second threshold for determining the collision risk are set. The first threshold is, for example, set to be a value that is approximately 30% to 50% of the maximum value of the collision risk. Moreover, the second threshold is, for example, set to be a value that is 50% or more of the maximum value of the collision risk. Of course, the present technology is not limited thereto, and the respective thresholds may be set so as to invoke attention at a suitable time.

For example, when the collision risk has been estimated, whether or not the collision risk is equal to or higher than the first threshold is determined (corresponding to Step 204). For example, in a case where the collision risk is lower than the first threshold, normal display of the second patterns is performed (corresponding to Step 205).

Moreover, in a case where the collision risk is equal to or higher than the first threshold, whether or not the collision risk is equal to or higher than the second threshold is determined (corresponding to Step 206). For example, in a case where the collision risk is smaller than the second threshold, the second patterns are displayed with long widths (corresponding to Step 207). Moreover, in a case where the collision risk is equal to or higher than the second threshold, blinking display of the second patterns is performed (corresponding to Step 208).

Accordingly, the display of the second patterns (typically the rear lines 3c) is discontinuously changed in accordance with the collision risk with the following vehicle. As a result, it is possible to represent the fact that the possibility of a collision with the vehicle 1 is increasing, for example, to the following vehicle traveling outside the vehicle and the like in an easy-to-understand manner.

Accidents where an automobile stops and a vehicle behind the automobile crushes into the automobile for example at a signal or at the end of a traffic jam have been reported. Drivers are advised to make an operation of "making the brake lights blink by pumping the brakes" or an operation of "turning on the hazard lights" as a measure for protecting themselves from those accidents. One of possible methods for automating those operations is a method of monitoring a following vehicle behind a vehicle and making the hazard lights blink automatically if a collision may occur. However, those operations cannot provide a sufficient effect in some cases. It is thus desirable to provide an effective warning method or the like for making the driver of the following vehicle notice that the preceding vehicle is stopping.

In the present embodiment, the rear lines 3c (second patterns) displaying the trajectories of the wheels or the like are projected on the rear of the traveling vehicle 1. These second patterns are switched to the display with the increased line widths (see FIG. 14B) or to the blinking display (see FIG. 14C) in accordance with the brake operation level. Therefore, it is possible to induce attention to the front from the driver of the following vehicle by using not only static display but also dynamic display. Accordingly, the occurrence of a collision with the following vehicle and the like can be avoided sufficiently.

Other Embodiments

The present technology is not limited to the above-mentioned embodiments, and various other embodiments can be realized.

In the above-mentioned embodiments, the patterns indicating the trajectories (passing trajectories and predicted trajectories) of the vehicle are mainly set as the line patterns. The present technology is not limited thereto, and for example, patterns of straight lines extending in the front-rear direction of the vehicle 1 may be used fixedly. Alternatively, patterns with ends of left and right lines closed for example may be used. In addition, patterns with any arbitrary shapes, sizes, colors may be used as the projection patterns.

In the processing described with reference to FIG. 13 and the like, the patterns (rear lines) as warning display to the following vehicle are changed and displayed. Additionally, for example, a warning sound may be emitted toward the following vehicle by using a directional speaker or the like. In this case, since an auditory warning sound is represented with a warning such as blinking display, a brake operation or collision risk can be represented effectively.

In the above description, the single controller has been exemplified as the embodiment of the information processing apparatus according to the present technology. However, the controller may be configured separately and any computer that is connected to the controller with a wire or wirelessly may realize the information processing apparatus according to the present technology. For example, a cloud server may execute the information processing method according to the present technology. Alternatively, the information processing method according to the present technology may be executed by cooperation of the controller with another computer.

That is, the information processing method and the program according to the present technology can be executed not only in a computer system configured by a single computer but also in a computer system in which a plurality of computer operates in cooperation. It should be noted that in the present disclosure, the system means a group of a plurality of components (apparatuses, modules (components), and the like) and it does not matter whether or not all components is in the same casing. Therefore, a plurality of apparatuses housed in separate casings and connected via a network and a single apparatus in which a plurality of modules is housed in a single casing are both systems.

The execution of the information processing method and the program according to the present technology according to the present technology by the computer system includes, for example, both a case where the speed-related information acquisition, the projection pattern display control, and the like are executed by a single computer and a case where the respective processes are executed by different computers. Moreover, execution of the respective processes by a predetermined computer includes causing another computer to execute some or all of the processes to acquire the results.

That is, the information processing method and the program according to the present technology can also be applied to a cloud computing configuration in which a single function is shared and processed cooperatively by a plurality of apparatuses over a network.

At least two features of the features according to the present technology, which have been described above, may be combined. That is, the various features described in the respective embodiments may be arbitrarily combined across the respective embodiments. Moreover, the above-mentioned various effects are merely illustrative, not limitative, and other effects may be provided.

In the present disclosure, the "same", "equal", "orthogonal", and the like are concepts including "substantially the same", "substantially equal", "substantially orthogonal", and the like. For example, conditions included in a predetermined range (e.g., ±10% range) based on "completely the same", "completely equal", "completely orthogonal", and the like are also included.

It should be noted that the present technology can also take the following configurations.

(1) An information processing apparatus, including:

an acquisition unit that acquires speed-related information regarding a speed of a vehicle; and a projection control unit that controls, on the basis of the speed-related information, display of a projection pattern projected on a peripheral road surface of the vehicle from the projection unit mounted on the vehicle.

(2) The information processing apparatus according to (1), in which the projection pattern includes a linear pattern, and the projection control unit controls a display parameter of at least one of a length, a width, a color, or blinking of the linear pattern.

(3) The information processing apparatus according to (2), in which the projection control unit controls the display parameter of the linear pattern in accordance with at least one of an accelerator operation or a brake operation of the vehicle.

(4) The information processing apparatus according to (3), in which the linear pattern includes a linear first pattern projected on front in a traveling direction of the vehicle and a linear second pattern projected on rear in the traveling direction, and the projection control unit controls at least the display parameter of the first pattern in accordance with the accelerator operation and controls at least the display parameter of the second pattern in accordance with the brake operation.

(5) The information processing apparatus according to (4), in which the speed-related information includes an opening degree of an accelerator, and the projection control unit increases a width of the first pattern as the opening degree of the accelerator increases.

(6) The information processing apparatus according to (4) or (5), in which the speed-related information includes an opening degree of a brake, and the projection control unit increases a width of the second pattern as the opening degree of the brake increases.

(7) The information processing apparatus according to any one of (4) to (6), in which the speed-related information includes the speed of the vehicle, and the projection control unit increases lengths of the first pattern and the second pattern as the speed of the vehicle increases.

(8) The information processing apparatus according to any one of (4) to (7), in which the speed-related information includes a deceleration parameter including at least one of deceleration of the vehicle, operation force of a brake, or an opening degree of the brake, and the projection control unit estimates a brake operation level on the basis of the deceleration parameter and discontinuously changes the second pattern in accordance with the brake operation level.

(9) The information processing apparatus according to (8), in which the projection control unit increases a width of the second pattern in a case where the brake operation level is equal to or higher than a first threshold and is lower than a second threshold higher than the first threshold, and makes the second pattern blink in a case where the brake operation level is equal to or higher than the second threshold.

(10) The information processing apparatus according to any one of (4) to (7), in which the acquisition unit acquires following vehicle information regarding a following vehicle behind the vehicle, and the projection control unit estimates a collision risk with the following vehicle on the basis of the following vehicle information and discontinuously changes the second pattern in accordance with the collision risk.

(11) The information processing apparatus according to any one of (4) to (10), further including a predicted trajectory calculation unit that calculates a predicted trajectory on which the vehicle is predicted to pass, in which the projection control unit generates the first pattern indicating the predicted trajectory.

(12) The information processing apparatus according to any one of (4) to (11), further including a passing trajectory calculation unit that calculates a passing trajectory on which the vehicle has passed, in which the projection control unit generates the second pattern indicating the passing trajectory.

(13) The information processing apparatus according to any one of (2) to (12), in which the projection pattern includes another pattern different from the linear pattern, and the projection control unit selects the other pattern as the projection pattern in a first status in which the vehicle has stopped and the vehicle does not move in accordance with an accelerator operation of the vehicle, and selects the linear pattern as the projection pattern in a second status in which the vehicle becomes movable in accordance with an accelerator operation of the vehicle.

(14) The information processing apparatus according to any one of (1) to (13), in which the acquisition unit acquires traveling status information regarding a traveling status of the vehicle, and the projection control unit switches, on the basis of the traveling status information, a type of the projection pattern or control content of a display parameter of the projection pattern.

(15) The information processing apparatus according to (14), in which the traveling status information includes at least one of a status of a shift position of the vehicle or a status of a parking brake of the vehicle.

(16) An information processing method, including:

by a computer system acquiring speed-related information regarding a speed of a vehicle; and controlling, on the basis of the speed-related information, display of a projection pattern projected on a peripheral road surface of the vehicle from a projection unit mounted on the vehicle.

(17) A program that causes a computer system to execute:

a step of acquiring speed-related information regarding a speed of a vehicle; and a step of controlling, on the basis of the speed-related information, display of a projection pattern projected on a peripheral road surface of the vehicle from a projection unit mounted on the vehicle.

(18) A projection apparatus, including:

a projection unit that is mounted on a vehicle and projects a projection pattern on a peripheral road surface of the vehicle;

an acquisition unit that acquires speed-related information regarding a speed of a vehicle; and a projection control unit that controls, on the basis of the speed-related information, display of the projection pattern projected from the projection unit.

REFERENCE SIGNS LIST

1, 1*a*, 1*b* vehicle
2 projection pattern
3 line pattern
3*a* front line
3*b* middle line
3*c* rear line
4 traveling direction
5 predicted trajectory
6 passing trajectory
7 stopping pattern
10, 10*a* to 10*h*, 210 projection unit
15, 215 storage unit
20, 220 controller
21, 221 vehicle information acquisition unit
22, 222 trajectory calculation unit
23, 223 projection image determination unit
30 driver
225 surrounding environment recognition unit
100, 200 projection apparatus

The invention claimed is:

1. An information processing apparatus, comprising:
circuitry configured to
acquire speed-related information regarding a speed of a vehicle; and
control, on a basis of the speed-related information, display of a projection pattern projected on a peripheral road surface of the vehicle from a projector mounted on the vehicle, wherein
the projection pattern includes a linear pattern of two lines that indicate which direction the vehicle is to move, wherein the circuitry is configured to control a display parameter of the linear pattern based on a control input, the control input being at least one of a detected degree of a driver's action or a estimated collision risk.

2. The information processing apparatus according to claim 1, wherein
the circuitry is configured to control a display parameter of at least one of a length, a width, a color, or blinking of the linear pattern.

3. The information processing apparatus according to claim 2, wherein
the circuitry is configured to control the display parameter of the linear pattern in accordance with at least one of an accelerator operation or a brake operation of the vehicle.

4. The information processing apparatus according to claim 3, wherein the linear pattern includes a linear first pattern projected on front in a traveling direction of the vehicle and a linear second pattern projected on rear in the traveling direction, and the circuitry is configured to control at least the display parameter of the linear first pattern in accordance with the accelerator operation and at least the display parameter of linear in accordance with the brake operation.

5. The information processing apparatus according to claim 4, wherein the driver's action includes an opening degree of an accelerator, and the circuitry is configured to increase a width of the linear first pattern as the opening degree of the accelerator increases.

6. The information processing apparatus according to claim 4, wherein the driver's action includes an opening degree of a brake, and the circuitry is configured to increase a width of the linear second pattern as the opening degree of the brake increases.

7. The information processing apparatus according to claim 4, wherein the speed-related information includes the speed of the vehicle, and the circuitry is configured to increase lengths of the linear first pattern and the linear second pattern as the speed of the vehicle increases.

8. The information processing apparatus according to claim 4, wherein the speed-related information includes a deceleration parameter including at least one of deceleration of the vehicle, operation force of a brake, or an opening degree of the brake, and the circuitry is configured to estimate a brake operation level on a basis of the deceleration parameter and discontinuously changes the linear second pattern in accordance with the brake operation level.

9. The information processing apparatus according to claim 8, wherein the circuitry is configured to increase a width of the second pattern in a case where the brake operation level is equal to or higher than a first threshold and is lower than a second threshold higher than the first threshold, and make the second pattern blink in a case where the brake operation level is equal to or higher than the second threshold.

10. The information processing apparatus according to claim 4, wherein the circuitry is configured to acquire following vehicle information regarding a following vehicle behind the vehicle, and estimate the collision risk with the following vehicle on a basis of the following vehicle information and discontinuously change the linear second pattern in accordance with the collision risk.

11. The information processing apparatus according to claim 4, wherein the circuitry is configured to calculate a predicted trajectory on which the vehicle is predicted to pass, and generate the linear first pattern indicating the predicted trajectory.

12. The information processing apparatus according to claim 4, wherein the circuitry is configured to calculate a passing trajectory on which the vehicle has passed, and generate the linear second pattern indicating the passing trajectory.

13. The information processing apparatus according to claim 2, wherein the projection pattern includes another pattern different from the linear pattern, and the circuitry is configured to select the other pattern as the projection pattern in a first status in which the vehicle has stopped and the vehicle does not move in accordance with an accelerator operation of the vehicle, and selects the linear pattern as the projection pattern in a second status in which the vehicle becomes movable in accordance with an accelerator operation of the vehicle.

14. The information processing apparatus according to claim 1, wherein the circuitry is configured to acquire traveling status information regarding a traveling status of the vehicle, and switch, on a basis of the traveling status information, a type of the projection pattern or control content of a display parameter of the projection pattern.

15. The information processing apparatus according to claim 14, wherein the traveling status information includes at least one of a status of a shift position of the vehicle or a status of a parking brake of the vehicle.

16. An information processing method, comprising:

by a computer system acquiring speed-related information regarding a speed of a vehicle;

controlling, on a basis of the speed-related information, display of a projection pattern projected on a peripheral road surface of the vehicle from a projector mounted on the vehicle, wherein the projection pattern includes a linear pattern of two lines that indicate which direction the vehicle is to move; and controlling a display parameter of the linear pattern based on a control input, the control input being at least one of a detected degree of a driver's action or an estimated collision risk.

17. A non-transitory computer readable storage device storing a program that causes a computer system to execute:

acquiring speed-related information regarding a speed of a vehicle;

controlling, on a basis of the speed-related information, display of a projection pattern projected on a peripheral road surface of the vehicle from a projector mounted on the vehicle, wherein the projection pattern includes a linear pattern of two lines that indicate which direction the vehicle is to move; and controlling a display parameter of the linear pattern based on a control input, the control input being at least one of a detected degree of a driver's action or an estimated collision risk.

18. A projection apparatus, comprising:

a projector to be mounted on a vehicle and to project a projection pattern on a peripheral road surface of the vehicle; and circuitry configured to acquire speed-related information regarding a speed of a vehicle; and control, on a basis of the speed-related information, display of the projection pattern projected from the projector, wherein the projection pattern includes a linear pattern of two lines that indicate which direction the vehicle is to move; and control a display parameter of the linear pattern based on
a control input, the control input being at least one of
a detected degree of a driver's action or a estimated
collision risk.

19. The information processing method according to
claim 16, wherein the projection pattern includes a linear
pattern, the method further comprising:

controlling a display parameter of at least one of a length,
a width, a color, or blinking of the linear pattern output
by the projector; and controlling the display parameter of the linear pattern in
accordance with at least one of an accelerator operation
or a brake operation of the vehicle.

20. The non-transitory computer readable storage device
according to claim 17, wherein the program further causes
the computer system to execute controlling a display parameter of at least one of a length,
a width, a color, or blinking of the linear pattern output
by the projector as the projection pattern; and controlling the display parameter of the linear pattern in
accordance with at least one of an accelerator operation
or a brake operation of the vehicle.

\* \* \* \* \*